United States Patent
Koike et al.

(10) Patent No.: US 11,999,385 B2
(45) Date of Patent: Jun. 4, 2024

(54) MOBILE OBJECT CONTROL SYSTEM, CONTROL METHOD, AND STORAGE MEDIUM

(71) Applicant: HONDA MOTOR CO., LTD., Tokyo (JP)

(72) Inventors: Yosuke Koike, Wako (JP); Misako Yoshimura, Wako (JP); Ichiro Baba, Wako (JP); Kosuke Nakanishi, Wako (JP); Koki Aizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

(21) Appl. No.: 17/671,643

(22) Filed: Feb. 15, 2022

(65) Prior Publication Data

US 2022/0274630 A1    Sep. 1, 2022

(30) Foreign Application Priority Data

Mar. 1, 2021    (JP) .................. 2021-031528

(51) Int. Cl.
  *B60W 60/00*    (2020.01)
  *G06V 20/56*    (2022.01)
  *G06V 20/58*    (2022.01)

(52) U.S. Cl.
  CPC ......... *B60W 60/0027* (2020.02); *G06V 20/58* (2022.01); *G06V 20/588* (2022.01);
  (Continued)

(58) Field of Classification Search
  CPC ..... B60W 60/0027; B60W 2554/4029; B60W 2554/4042; B60W 2552/45;
  (Continued)

(56) References Cited

U.S. PATENT DOCUMENTS

2020/0047342 A1*    2/2020    Lee ................. G05D 1/0227

FOREIGN PATENT DOCUMENTS

| JP | 2017-102601 | 6/2017 |
|----|-------------|--------|
| JP | 6559864     | 8/2019 |

(Continued)

OTHER PUBLICATIONS

Japanese Office Action for Japanese Patent Application No. 2021-031528 dated Apr. 18, 2023.

(Continued)

*Primary Examiner* — Jacob M Amick
(74) *Attorney, Agent, or Firm* — Amin, Turocy & Watson, LLP

(57) ABSTRACT

A mobile object control system includes: a storage device configured to store instructions; and one or more processors, wherein the one or more processors execute the instructions stored in the storage device to: acquire an image in which a road where a mobile object is present is imaged; recognize support information for supporting movement of a specific traffic participant who is a traffic participant having a predetermined attribute appearing on a road surface included in the image; recognize a road structure included in the image or a road structure which is a structure provided on the road; move the mobile object at least based on a trajectory determined using the support information when the support information is recognized; and move the mobile object based on a trajectory determined using the road structure without using the support information when the support information has not been recognized.

10 Claims, 19 Drawing Sheets

(52) U.S. Cl.
CPC ... *B60W 2420/403* (2013.01); *B60W 2552/45* (2020.02); *B60W 2552/50* (2020.02); *B60W 2554/4029* (2020.02); *B60W 2554/4042* (2020.02)

(58) Field of Classification Search
CPC ....... B60W 2552/50; B60W 2420/403; B60W 60/00272; B60W 60/00274; B60W 60/00276; G06V 20/58; G06V 20/588
See application file for complete search history.

(56) References Cited

FOREIGN PATENT DOCUMENTS

| | | |
|---|---|---|
| JP | 2020-168953 | 10/2020 |
| KR | 10-2021-0017452 | 2/2021 |

OTHER PUBLICATIONS

Japanese Office Action for Japanese Patent Application No. 2021-031528 dated Dec. 13, 2022.

* cited by examiner

Bg

TRAVELING DIRECTION

Bw

MOBILE OBJECT CONTROL SYSTEM, CONTROL METHOD, AND STORAGE MEDIUM

CROSS-REFERENCE TO RELATED APPLICATION

This application claims priority to and the benefit from Japanese Patent Application No. 2021-031528, filed on Mar. 1, 2021, the contents of which are hereby incorporated by reference into the present application.

FIELD

The present invention relates to mobile object control systems, control methods, and storage media.

DESCRIPTION OF RELATED ART

Conventionally, an automated traveling system for controlling traveling based on an image in which a Braille block is imaged has been disclosed (Japanese Unexamined Patent Application, First Publication No. 2017-102601).

SUMMARY

However, with the above-described technology, there are cases where it is not possible to cause the mobile object to travel through appropriate positions.

With the foregoing in view, one of the objects of the present invention is to provide a mobile object control system, a control method, and a storage medium capable of causing a mobile object to move through appropriate positions.

The mobile object control system, control method, and storage medium according to the present invention have the following configurations.

(1) A mobile object control system includes: a storage device configured to store instructions; and one or more processors, wherein the one or more processors execute the instructions stored in the storage device to: acquire an image in which a road where a mobile object is present is imaged; recognize support information for supporting movement of a specific traffic participant who is a traffic participant having a predetermined attribute appearing on a road surface included in the image; recognize a road structure included in the image or a road structure which is a structure provided on the road in the image; move the mobile object at least based on a trajectory determined using the support information when the support information is recognized; and move the mobile object based on a trajectory determined using the road structure without using the support information when the support information has not been recognized.

(2) In aspect (1), the support information is a plurality of Braille blocks provided on a sidewalk of the road, and the one or more processors execute the instructions to: determine the trajectory at least based on a direction in which the plurality of Braille blocks are connected when the support information is recognized.

(3) In aspect (1) or (2), the one or more processors execute the instructions to: move the mobile object based on a trajectory determined using an extension direction of a sidewalk included in the road, a structure that separates the sidewalk from a roadway, or a structure that separates the sidewalk from a region different from the sidewalk on an opposite side of the roadway without using the support information when the support information has not been recognized.

(4) In aspect (3), the structure is a guardrail, a curb, a fence, or a plant.

(5) In any one of aspects (1) to (4), the traffic participant is a pedestrian, and the one or more processors execute the instructions to: determine the trajectory based on the support information and an attribute of the pedestrian when the support information is recognized and a pedestrian is present in the a position according to where the support information appears or in the vicinity of a position according to where the support information appears.

(6) In aspect (5), the traffic participant is a pedestrian and the one or more processors execute the instructions to: generate a trajectory for moving through positions farther from the pedestrian when the pedestrian is the specific traffic participant than when the pedestrian is a pedestrian different from the specific traffic participant.

(7) In any one of aspects (1) to (6), the traffic participant is a pedestrian and the support information is a plurality of Braille blocks provided on a sidewalk of the road, the Braille blocks include a guidance block that indicates a traveling direction in which the specific traffic participant travels and guides movement of the specific traffic participant, and a warning block that warns the specific traffic participant, and the one or more processors execute the instructions to: when it is recognized that the guidance block and a warning block connected to the guidance block are provided in this order on a sidewalk from a position of the mobile object, move the mobile object based on a first trajectory in which the mobile object moves along a guidance direction indicated by the guidance block and the mobile object decelerates or stops at or in the vicinity of the warning block.

(8) In aspect (7), the traffic participant is a pedestrian, and the one or more processors execute the instructions to: cancel deceleration of the mobile object or starting the mobile object from a stopped state when condition (b), (c), or (d) is satisfied after condition (a) is satisfied: (a) the specific traffic participant is present at or in the vicinity of a warning block when the mobile object decelerates or stops and the mobile object moving based on the first trajectory reaches the warning block or the vicinity of the warning block; (b) the specific traffic participant is going straight ahead after passing a warning block; (c) the specific traffic participant is moving in a first direction and has crossed the mobile object; and (d) the specific traffic participant moves in a second direction opposite to the first direction.

(9) A control method according to an aspect of the present invention is a control method for causing a computer to execute: acquiring an image in which a road where a mobile object is present is imaged; recognizing support information for supporting walking of a specific traffic participant who is a traffic participant having a predetermined attribute appearing on a road surface included in the image; recognizing a road structure included in the image or a road structure which is a structure provided on the road in the image; moving the mobile object at least based on a trajectory determined using the support information when the support information is recognized; and moving the mobile object based on a trajectory determined using the road structure without using the support information when the support information has not been recognized.

(10) Instructions stored in a non-transitory computer storage medium according to an aspect of the present invention is instructions for causing a computer to execute: acquiring an image in which a road where a mobile object is present is imaged; recognizing support information for supporting walking of a specific traffic participant who is a traffic participant having a predetermined attribute appearing on a road surface included in the image; recognizing a road structure included in the image or a road structure which is a structure provided on the road in the image; moving the mobile object at least based on a trajectory determined using the support information when the support information is recognized; and moving the mobile object based on a trajectory determined using the road structure without using the support information when the support information has not been recognized.

According to aspects (1) to (10), the mobile object control system can allow the mobile object to move through more appropriate positions by generating a trajectory using an appropriate object according to the recognition result of the support information.

According to aspect (5) or (6), the mobile object control system can realize movement with consideration of pedestrians by generating the trajectory by taking the attribute of the pedestrian into consideration.

According to aspect (7), the mobile object control system can allow the mobile object to move with more consideration of the surroundings by moving the mobile object based on the first trajectory in which the mobile object decelerates or stops at or in the vicinity of the warning block.

According to aspect (8), the mobile object control system can allow the mobile object to move with consideration of specific traffic participants by canceling the deceleration of the mobile object or starting the mobile object from the stopped state after the specific traffic participant performs a predetermined behavior when the specific traffic participant is present at or in the vicinity of the warning block.

DETAILED DESCRIPTION

Hereinafter, the mobile object control system, the control method, and the storage medium according to the embodiment of the present invention will be described with reference to the drawings. As used throughout this disclosure, the singular forms "a," "an," and "the" include plural reference unless the context clearly dictates otherwise.

Embodiment

[Overall Configuration]

Figure 1:
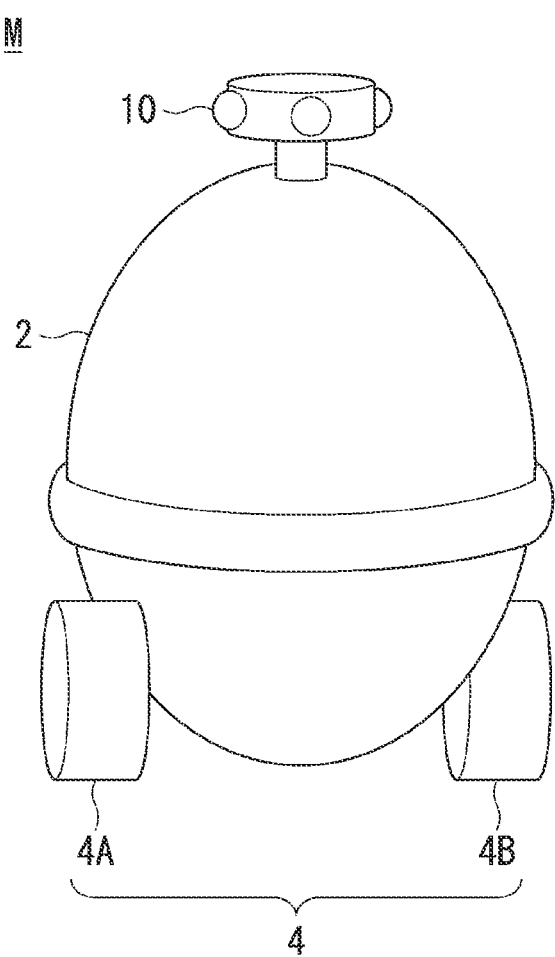
FIG. 1 is a diagram showing an example of a mobile object including a control device according to an embodiment.

FIG. 1 is a diagram showing an example of a mobile object M including a control device according to an embodiment. The mobile object M is an autonomous mobile robot. The mobile object M supports the user's behavior. For example, the mobile object M stops at a position designated by the user, carries the user, and transports the user to the destination. In the present embodiment, the mobile object M is described as moving while carrying the user aboard. However, instead of this (or in addition to this), the mobile object M may transport an article or lead the user to move together with the user and may follow the user to support the users behavior, and the mobile object M may or may not be able to carry the user aboard. In the following description, while the mobile object M is described as traveling, when the mobile object M does not travel but moves by walking or in other modes, the following words "traveling" and "travelable area" may be read "moving" and "movable area".

The mobile object M includes a main body 2, one or more wheels 4 (4A and 4B in the figure), and a camera 10. The main body 2 is provided with an entrance and exit such as a door (not shown) that allows the user to enter and exit the main body 2, and the user can enter the main body 2 from the entrance and exit and board the mobile object M. For example, the mobile object M drives the wheel 4 based on the image captured by the camera 10 to transport the user M.

In the present embodiment, the user is described as boarding in the main body 2. However, instead of this (or in addition to this), the mobile object M may be provided with a seating portion on which the user can be seated without boarding in the main body 2 to move together with the mobile object M, a step on which the user puts his/her foot for movement, and the like. For example, the moving object may be scooter.

Figure 2:
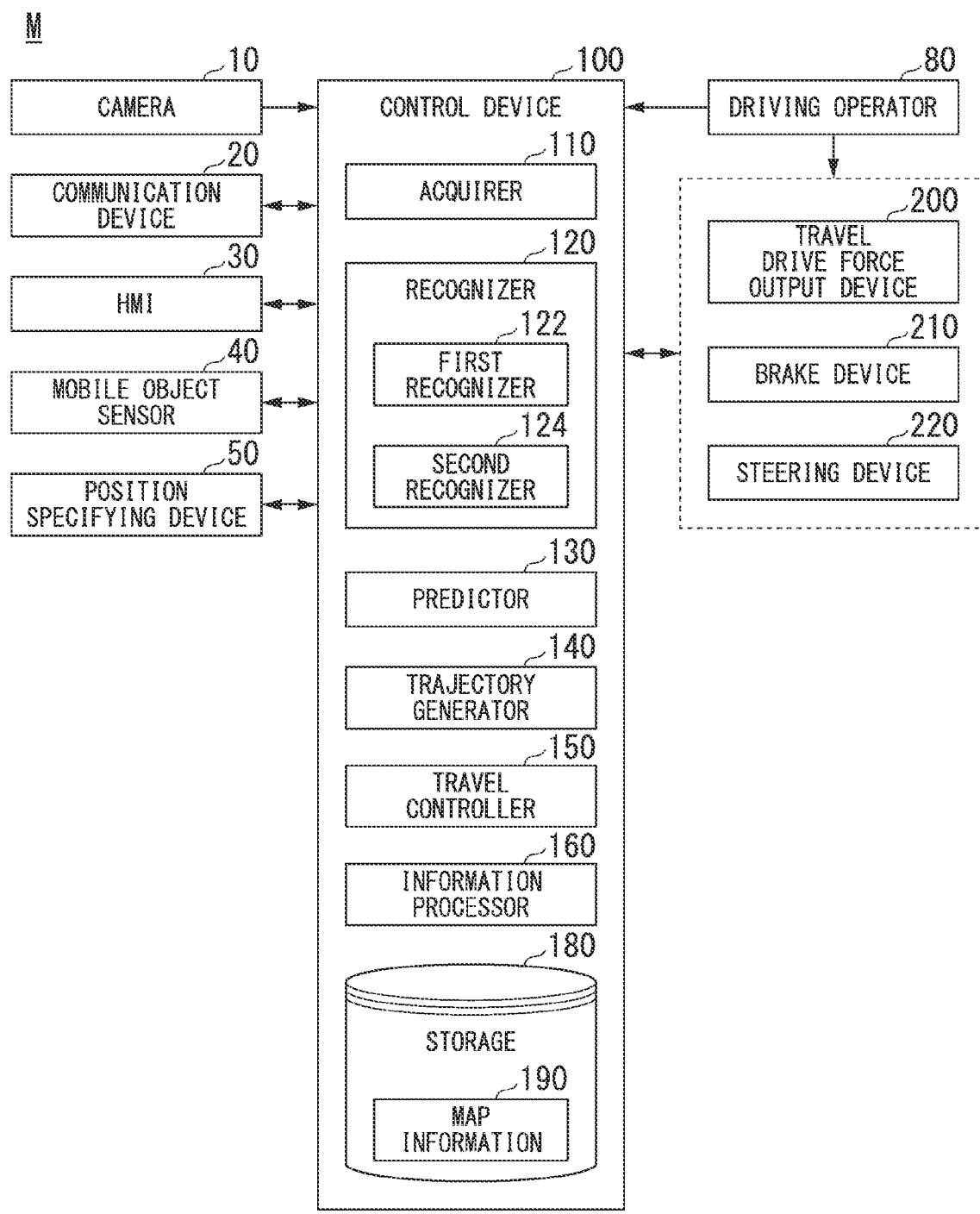
FIG. 2 is a diagram showing an example of another functional configuration included in a mobile object.

FIG. 2 is a diagram showing an example of another functional configuration included in the mobile object M. The mobile object M includes, for example, a camera 10, a communication device 20, an HMI 30, a mobile object sensor 40, a position specifying device 50, a driving operator 80, a control device 100, a travel drive force output device 200, a brake device 210, and a steering device 220.

The camera 10 captures the images around the mobile object M. The camera 10 is, for example, a fisheye camera capable of capturing the images around the mobile object M at a wide angle (for example, at 360 degrees). The camera 10 is attached to the upper part of the mobile object M, for example, and captures the images around the mobile object M at a wide angle in the horizontal direction. The camera 10 may be realized by combining a plurality of cameras (a plurality of cameras that capture a range of 120 degrees or a range of 60 degrees with respect to the horizontal direction). In addition to the camera 10, the mobile object M may include a radar device or LIDAR that detects an object.

The communication device 20 is a communication interface for communicating with other devices using a cellular network, a Wi-Fi network, Bluetooth (registered trademark), a dedicated short range communication (DSRC), or the like.

The HMI 30 presents various pieces of information to the user of the mobile object M and receives input operations of the user. The HMI 30 includes various display devices, speakers, buzzers, touch panels, switches, keys, and the like.

The mobile object sensor 40 includes a vehicle speed sensor that detects the speed of the mobile object M, an acceleration sensor that detects acceleration of the mobile object M, a yaw rate sensor that detects the angular speed around the vertical axis, and an azimuth sensor that detects the direction of the mobile object M, and the like.

The position specifying device 50 specifies the position of the mobile object M based on the signal received from a GNSS satellite. The position of the mobile object M may be specified or complemented by an inertial navigation system (INS) using the output of the mobile object sensor 40.

The driving operator 80 includes, for example, an acceleration pedal, a brake pedal, a shift lever, a steering wheel, a deformed steering wheel, a joystick, and other operators. Sensors that detect an amount of operation or the presence of an operation are attached to the driving operator 80, and the detection results are output to the control device 100, or any one or all of the travel drive force output device 200, the brake device 210, and the steering device 220. If the mobile object M is controlled only by automated driving, the driving operator 80 may be omitted.

The control device 100 includes, for example, an acquirer 110, a recognizer 120, a predictor 130, a trajectory generator 140, a travel controller 150, an information processor 160, and a storage 180. The acquirer 110, the recognizer 120, the predictor 130, the trajectory generator 140, the travel controller 150, and the information processor 160 each are realized when a hardware processor such as a central processing unit (CPU) or the like executes a program (software). Some or all of these components may be realized by hardware (a circuit portion; including circuitry) such as large scale integration (LSI), an application specific integrated circuit (ASIC), a field-programmable gate array (FPGA), or a graphics processing unit (GPU) and may be realized by the cooperation of software and hardware. The program may be stored in advance in the storage 180 (a storage device including a non-transitory storage medium) such as a HDD or a flash memory and may be stored in a removable storage medium such as a DVD or a CD-ROM and be installed in a HDD or a flash memory when a storage medium (a non-transitory storage medium) is attached to a drive device. Some of the above-mentioned functional units may be included in other devices. For example, the recognizer 120 may be included in another device and analyze an image captured by a camera that is provided on the roadway or sidewalk to capture the image of the roadway or sidewalk to recognize the condition of the roadway or sidewalk or the state of an object present on the roadway or sidewalk. In this case, the control device 100 may acquire the above-described recognition result from another device and perform various processes based on the acquired recognition result. For example, a functional configuration including one or all of the acquirer 110, the recognizer 120, the predictor 130, and the trajectory generator 140 and the travel controller 150 is an example of a "mobile object control system".

The acquirer 110 acquires the image captured by the camera 10. The acquirer 110 acquires the image of a road surface around the mobile object M.

The recognizer 120 recognizes an object or a situation around the mobile object M using, for example, the functions of artificial intelligence (AI) or the functions of a predetermined model, or using them in parallel. For example, the function of "recognizing the area where the mobile object M can travel" may be realized by executing recognition of roads, sidewalks, curbs, and the like by deep learning and recognition based on a predetermined condition (signals which can be subjected to pattern matching) in parallel and scoring both recognition results to make comprehensive evaluation. The recognizer 120 may execute a semantic segmentation process to classify pixels in the frame of an image into classes (for example, an object, a travelable area, a non-travelable area, and the like) and recognize an area in which the mobile object M can travel based on the classification result. As a result, the reliability of the movement of the mobile object M is guaranteed.

The recognizer 120 recognizes the state such as a position, a speed, an acceleration, and the like of an object around the mobile object M based on the image captured by the camera 10. The position of an object is recognized as the position on an absolute coordinate system in which a representative point (the center of gravity, the center of a driving shaft, or the like) of the mobile object M is at the origin, for example, and is used for control. The position of an object may be represented by a representative point such as the center of gravity or a corner of the object and may be represented by an area. The "state" of an object may include the acceleration or a jerk of an object or a "behavior state" (for example, whether the object has changed or is trying to change lanes). The recognizer 120 recognizes, for example, lane marks, road shoulders, curbs, a median strip, guard rails, a temporary stop line, an obstacle, a sign, and other road events. The recognizer 120 recognizes the position and posture of the mobile object M. The recognizer 120 includes, for example, a first recognizer 122 and a second recognizer 124. The details of the processing of these units will be described later.

The trajectory generator 140 determines one or both of a stop position where the mobile object M stops and a traveling position where the mobile object M travels based on the user's instruction, the area where the mobile object M can travel, and the area where the mobile object M cannot travel.

The trajectory generator 140 generates a target trajectory along which the mobile object M travels in the future automatically (regardless of an operation of a driver) so that it is possible to cope with a surrounding situation of the mobile object M. The target trajectory includes a speed element, for example. For example, the target trajectory is represented as an arrangement of positions (trajectory points) that the mobile object M has to reach. The trajectory points are positions that the mobile object M has to reach every predetermined travel distance (for example, approximately every several [m]) as the distance along a road. In addition to this, a target speed and a target acceleration every predetermined sampling period (for example, approximately every 0.x [sec]) are generated as part of the target trajectory. The trajectory points may be the positions that the mobile object M has to reach at respective sampling time points of the predetermined sampling periods. In this case, the information of the target speed and the target acceleration is represented by the intervals of the trajectory points.

The trajectory generator 140 generates a trajectory along which the mobile object M moves, and calculates the risk of the generated trajectory. The risk is an index value indicating the height of possibility that the mobile object M approaches an obstacle. The risk tends to become higher as the distance from the obstacle to the trajectory (trajectory point of the trajectory) is smaller, and become lower as the distance from the obstacle to the trajectory (trajectory point) is larger.

In the trajectory generator 140, when a total value of the risks and the risk of each trajectory point satisfy predetermined criteria (for example, when the total value is a threshold value Th1 or less and the risk of each trajectory point is a threshold value Th2 or less), a trajectory that satisfies the criteria is adopted as the trajectory along which the mobile object moves.

The travel controller 150 travels the mobile object M along a trajectory that satisfies predetermined criteria. The travel controller 150 outputs a command value for the mobile object M to travel along the trajectory to the travel drive force output device 200.

The information processor 160 controls various apparatuses and devices included in the mobile object M. The information processor 160 controls, for example, the HMI 30. The information processor 160 acquires voice data input to the microphone and recognizes an operation performed on the operating device.

The travel drive force output device 200 outputs a travel drive force (torque) for the mobile object M to travel to the drive wheels. The travel drive force output device 200 includes, for example, an electric motor, and an electronic control unit (ECU) that controls these components. The ECU controls the above-mentioned components according to the information input from the travel controller 150 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the travel controller 150 or the information input from the driving operator 80 so that brake torque corresponding to a braking operation is output to each wheel.

The steering device 220 includes, for example, a steering ECU and an electric motor. The electric motor, for example, applies a force to a rack-and-pinion mechanism to change the direction of a steering wheel. The steering ECU drives an electric motor according to the information input from the travel controller 150 or the information input from the driving operator 80 to change the direction of the steering wheel.

[Overview of Control of Mobile Object]

Figure 3:
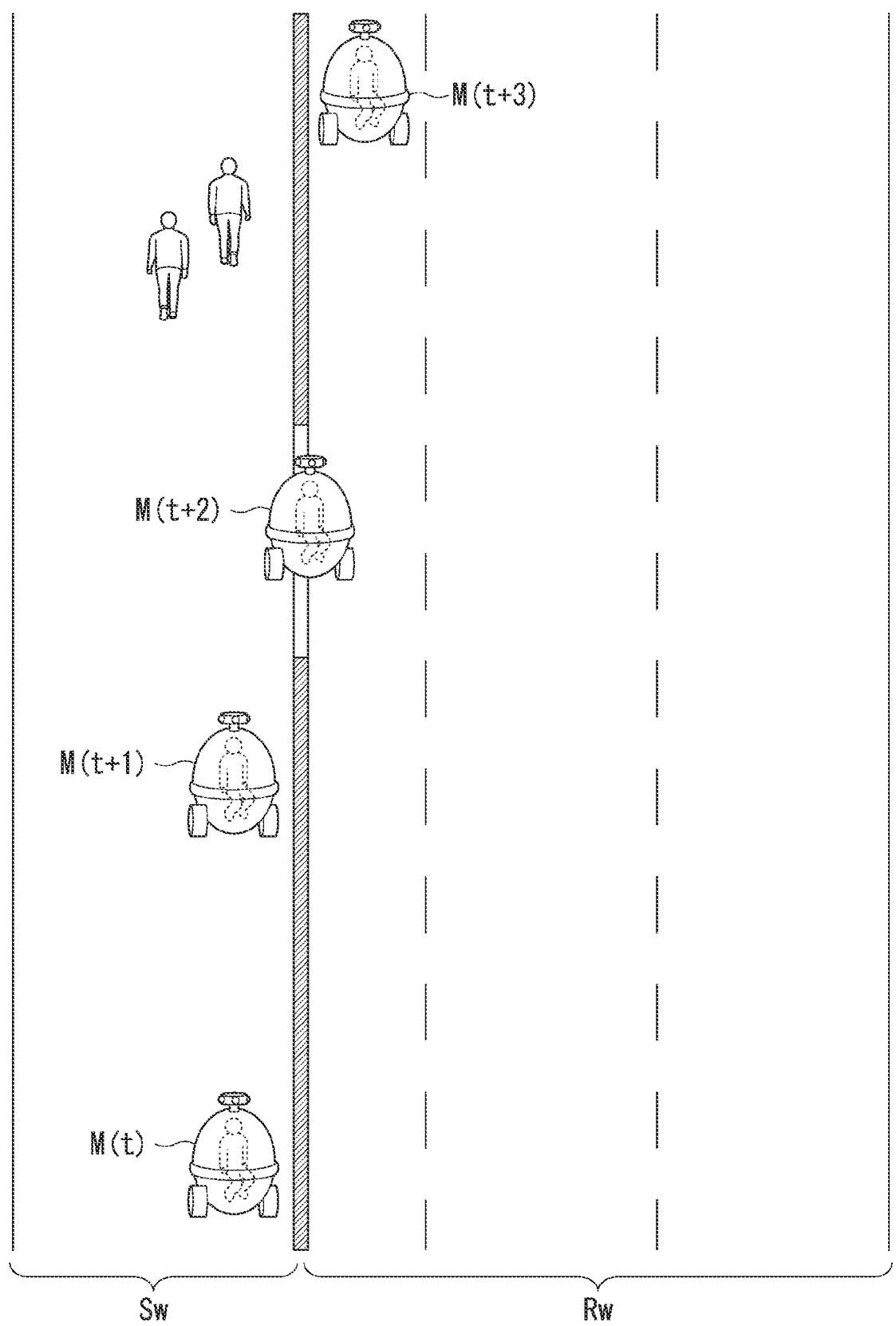
FIG. 3 is a diagram showing an example of the behavior of a mobile object.

FIG. 3 is a diagram showing an example of the behavior of the mobile object M. The mobile object M, for example, carries a user and heads for a destination (waypoint). At this time, the mobile object M travels on the sidewalk Sw (time t, t+1), or descends from the sidewalk Sw to the roadway Rw and travels on the roadway Rw (time t+2, time t+3). The mobile object M, for example, travels on the sidewalk Sw at a speed as high as the walking speed of a pedestrian (for example, 4 km/h or 6 km/h), and, for example, travels on the roadway Rw at a speed higher than the above-mentioned walking speed.

The first recognizer 122 of the control device 100 recognizes the support information for supporting the walking of a specific pedestrian who is a pedestrian having a predetermined attribute obtained from the road surface imaged in the image. The second recognizer 124 of the control device 100 recognizes the sidewalk structure included in the image or the sidewalk structure which is a structure provided for walking. The structure of the sidewalk is the direction in which the sidewalk extends. The structure provided on the sidewalk is a structure that separates the sidewalk from the roadway, such as guard rails, curbs, fences, and plants, or a structure that separates the sidewalk from an area different from the sidewalk on the opposite side of the roadway. The predictor 130 predicts the behavior of the pedestrian recognized by the recognizer 120 based on the support information.

When the first recognizer 122 recognizes the support information, the control device 100 moves the mobile object M based on at least the trajectory determined using the support information. When the first recognizer 122 does not recognize the support information but recognizes the structure, the control device 100 moves the mobile object M based on the trajectory determined using the structure without using the support information. The movement means, for example, that the trajectory generator 140 and the travel controller 150 cooperate to move the mobile object M, and for example, the travel controller 150 controls the travel drive force output device 200, the brake device 210, and the steering device 220 so that the mobile object M moves along the trajectory generated by the trajectory generator 140.

Figure 4:
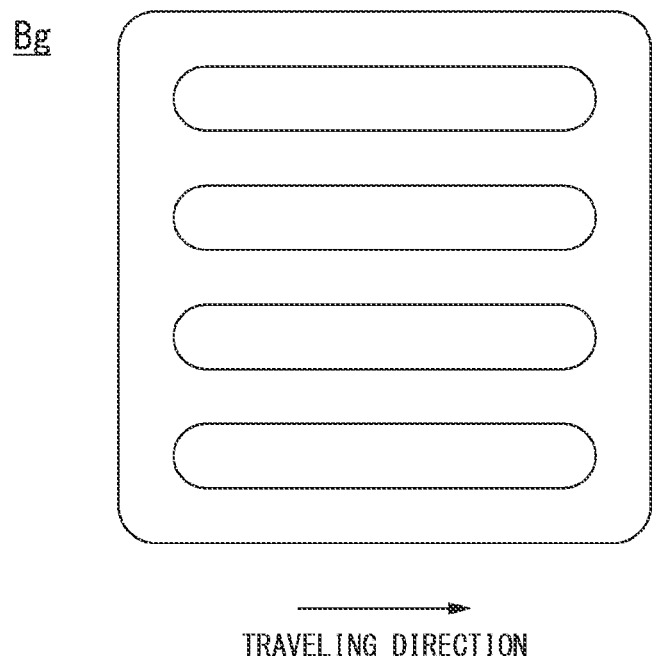
FIG. 4 is a diagram showing an example of a guidance block.

The support information for supporting the walking of a specific pedestrian having a predetermined attribute is, for example, a Braille block. Braille blocks include, for example, guidance blocks and warning blocks. FIG. 4 is a diagram showing an example of a guidance block Bg. The guidance block Bg has a plurality of linear protrusions. The protrusions are provided on the surface of the block, and the longitudinal direction of the protrusions indicates the direction in which a specific pedestrian moves.

Figure 5:
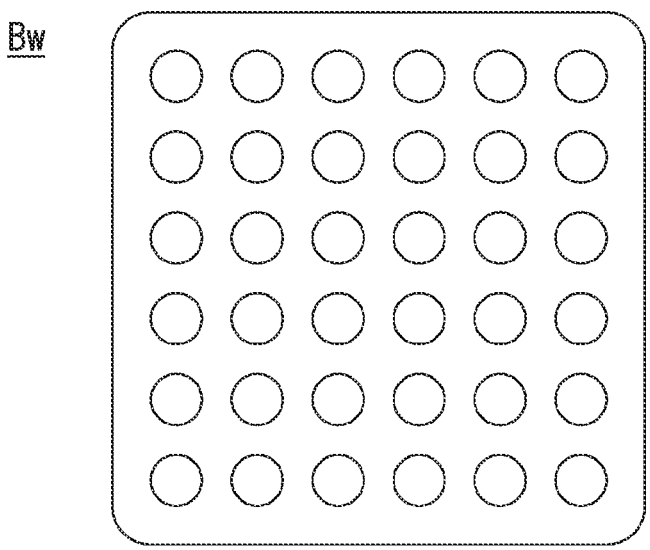
FIG. 5 is a diagram showing another example of a warning block.

FIG. 5 is a diagram showing another example of a warning block Bw. The warning block Bw has a plurality of point-like protrusions. The protrusions are provided on the surface of the block. The plurality of point-like protrusions calls for alerts and warnings for specific pedestrians. For example, the warning block Bw is installed in front of stairs, in front of a pedestrian crossing, at a branch point where guidance blocks Bg intersect, in front of a guide plate, in front of an obstacle, at the end of a platform of a station, or the like.

In the present embodiment, the support information is described as being a Braille block. However, instead of this (or in addition to this), the support information may be information for supporting the walking of a specific pedestrian or another pedestrian, or information indicated by an object.

The behavior of the mobile object M will be illustrated. The behavior of the mobile object M described below is executed, for example, based on the control of the control device 100. The processes described below may be executed in a superimposed manner.

[Behavior (1) of Mobile Object]

When the mobile object M recognizes the guidance block Bg and the traveling direction indicated by the guidance block Bg matches the traveling direction of the mobile object M (the direction of the route toward the destination), the mobile object M generates a trajectory parallel (or substantially parallel) to the traveling direction indicated by the guidance block Bg and travels along the generated trajectory. The matching means that the degree of deviation between a vector corresponding to the traveling direction indicated by the guidance block Bg and a vector in the traveling direction of the mobile object M is within a predetermined angle (for example, 30 degrees or 45 degrees).

Figure 6:
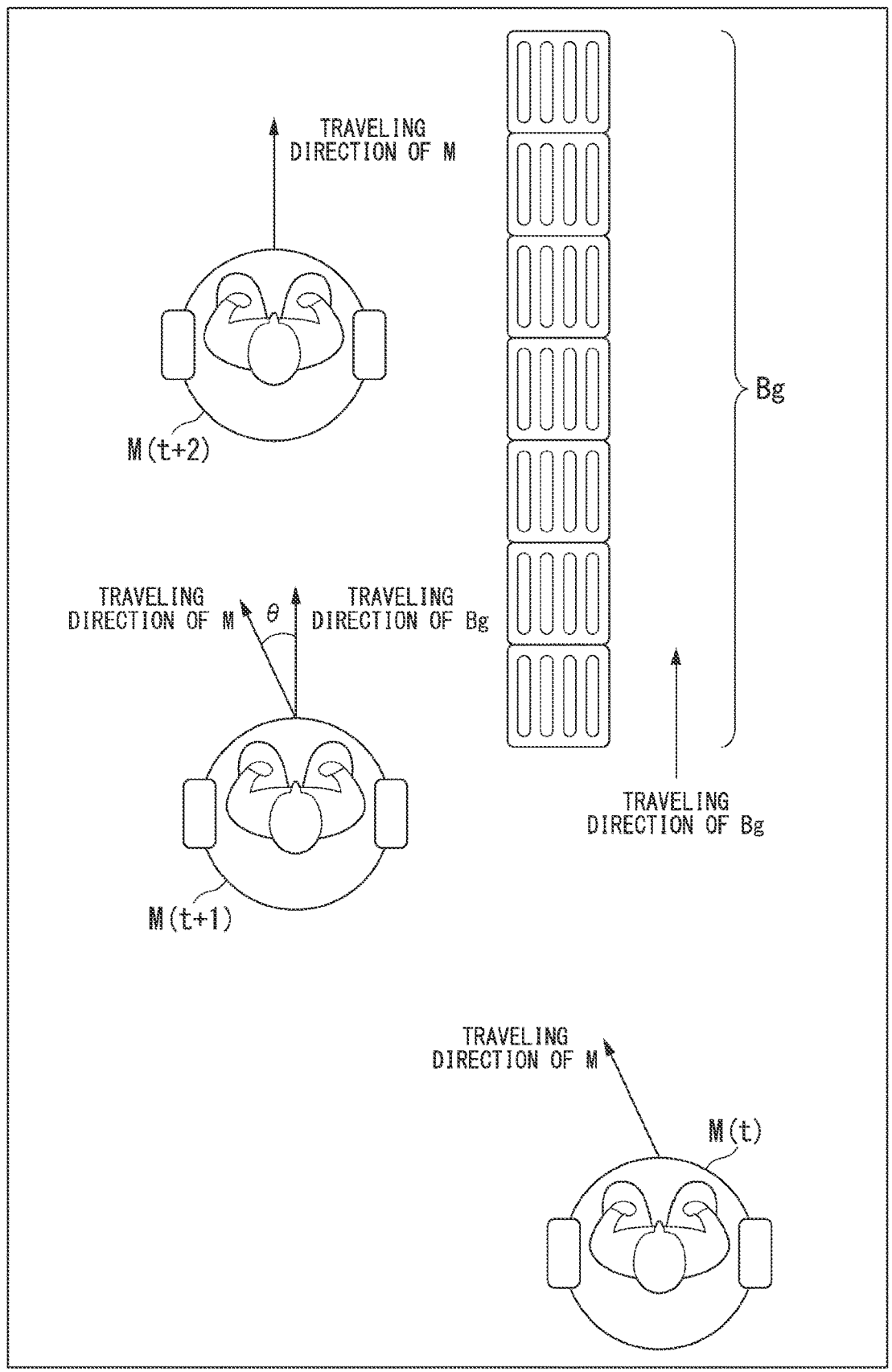
FIG. 6 is a diagram showing the behavior (1) of a mobile object.

FIG. 6 is a diagram showing the behavior (1) of the mobile object M. At time t, the mobile object M is traveling in a predetermined direction. At time t+1, the mobile object M recognizes the guidance block Bg, reaches the vicinity of the guidance block Bg, and determines whether the angle θ between the traveling direction of the mobile object M and the traveling direction indicated by the guidance block Bg is equal to or less than a predetermined angle. At time t+2, when the angle θ is equal to or less than the predetermined angle, the mobile object M travels along the traveling direction indicated by the guidance block Bg.

As described above, when the mobile object M travels based on the guidance block Bg, it is possible to realize the control of the mobile object with more consideration of the pedestrians in the vicinity. For example, since pedestrians have a high tendency to move along the traveling direction indicated by the guidance block Bg, the pedestrians travel with more consideration of the pedestrians in the vicinity. Further, since the mobile object M moves along the traveling direction indicated by the guidance block Bg, the mobile object M can travel through more appropriate positions.

[Behavior (2) of Mobile Object]

Figure 7:
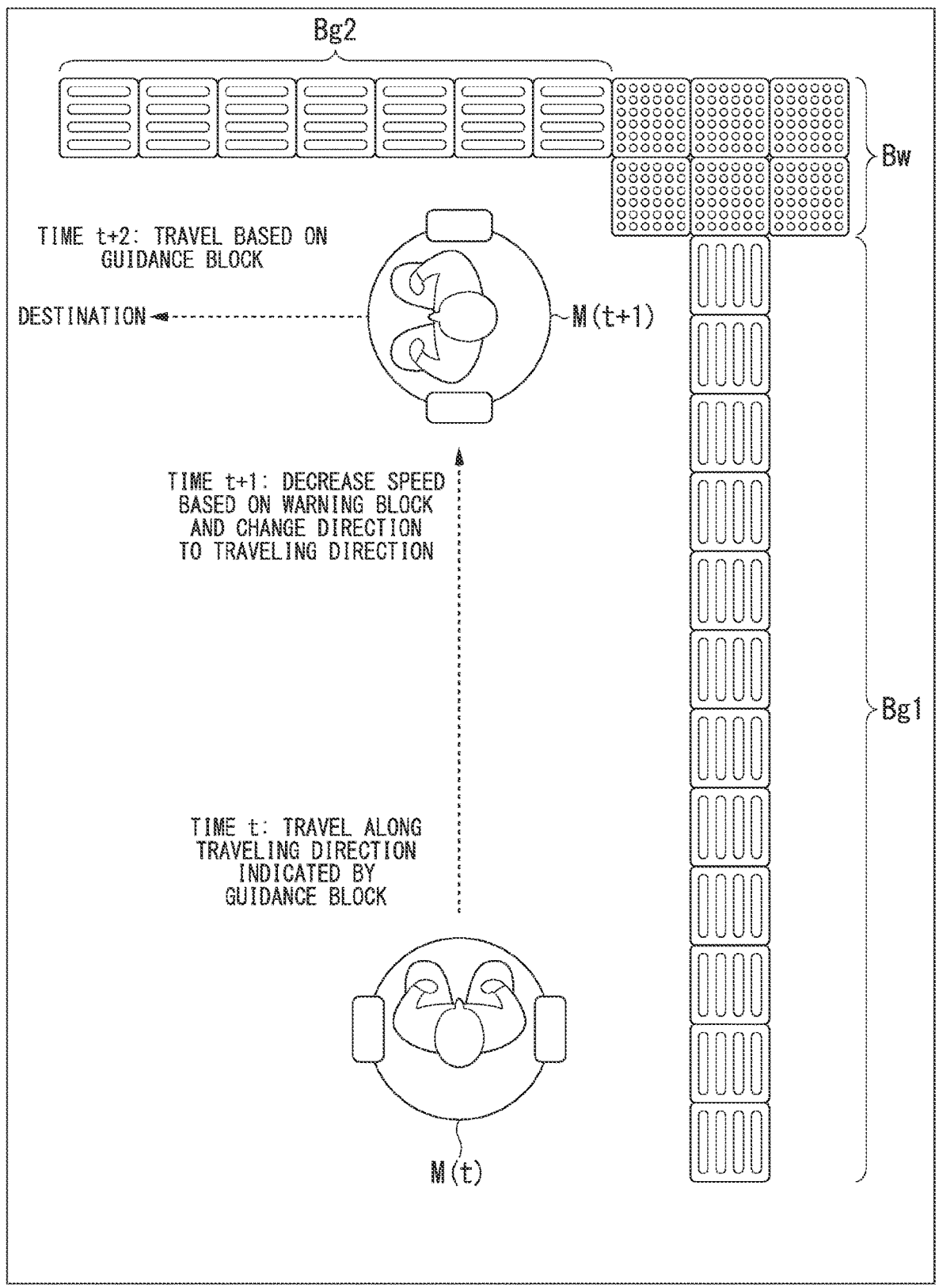
FIG. 7 is a diagram showing the behavior (2) of a mobile object.

FIG. 7 is a diagram showing the behavior (2) of the mobile object M. At time t, the mobile object M is traveling along the traveling direction indicated by the guidance block Bg. At time t+1, the mobile object M arrives near the warning block Bw and decelerates. When the warning block Bw and a new guidance block Bg2 connected to the warning block Bw are recognized, the mobile object M decelerates or stops in front of (near) the warning block Bw. When there is no object such as a pedestrian in the vicinity, the mobile object M turns in the traveling direction indicated by the guidance block Bg2 and travels along the traveling direction indicated by the guidance block Bg2. This traveling direction is, for example, the direction of the destination of the mobile object M. The traveling direction indicated by the guidance block Bg2 is a direction intersecting the traveling direction indicated by the guidance block Bg1.

As described above, when the mobile object M travels based on the guidance block Bg1, the warning block, and the guidance block Bg2, it is possible to realize the control of the mobile object M with consideration of the pedestrians in the vicinity. For example, since pedestrians have a high tendency to move along the guidance block Bg1, the warning block, and the guidance block Bg2, the mobile object M travels with more consideration of the pedestrians in the vicinity. Further, since the mobile object M moves along the traveling direction indicated by the guidance block, the mobile object M can travel through more appropriate positions. The mobile object M may decelerate or stop in front of (near) the warning block Bw even when the warning block Bw is recognized and the mobile object M does not move along the traveling direction indicated by the guidance block Bg.

[Trajectory Generation Process (1)]

Figure 8:
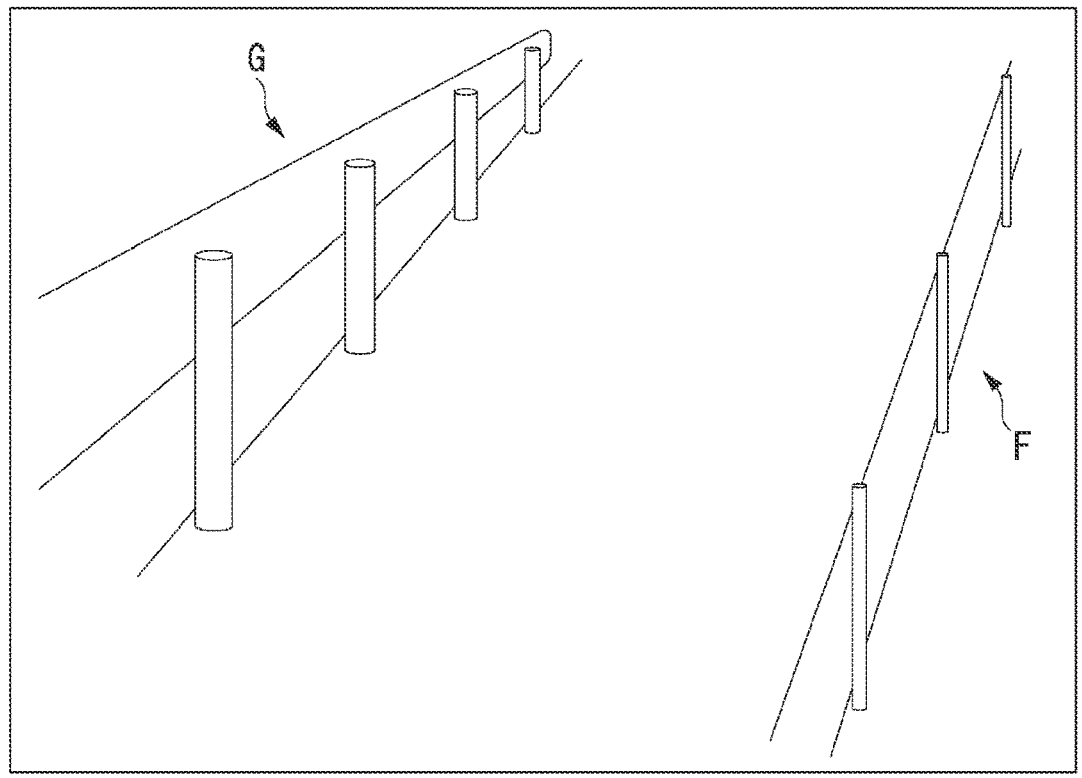
FIG. 8 is a diagram showing an example of a sidewalk and a trajectory generated for the sidewalk.

The process of generating a trajectory when the mobile object M is traveling on the sidewalk will be described. It is assumed that the mobile object M is traveling on the sidewalk as shown in FIG. 8. A guardrail G and a fence F are provided on the sidewalk. The guardrail G is provided at the boundary between the roadway and the sidewalk, and the fence is provided at the boundary between the sidewalk and the area opposite to the roadway.

The trajectory generator 140 of the mobile object M identifies a travelable area based on the information included in the image. For example, the trajectory generator 140 generates a trajectory based on the shape of the sidewalk, the shape of the guardrail, the shape of the fence, and the like.

Figure 9:
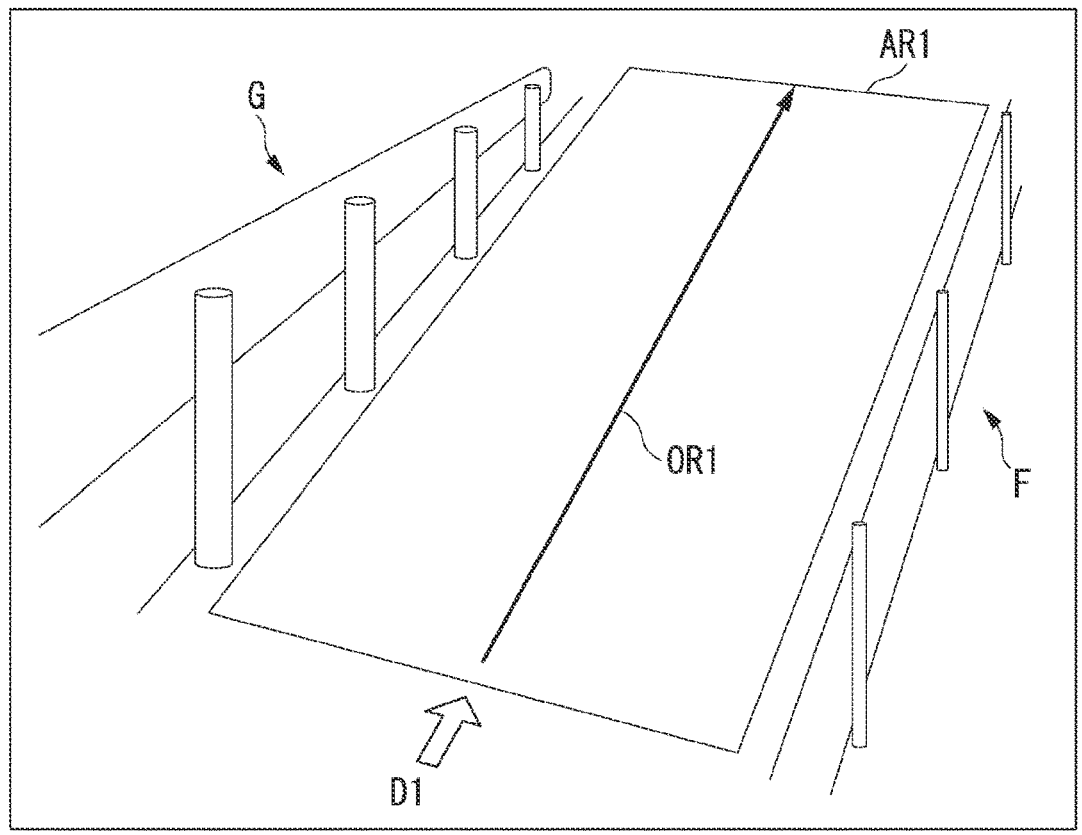
FIG. 9 is a diagram (1) showing the generation of trajectories.

FIG. 9 is a diagram (1) showing the generation of the trajectory. The trajectory generator 140 recognizes, for example, a travelable area AR in which the mobile object M can travel. The travelable area AR is an area in which there is no structure that interferes with the movement of the mobile object M, such as a guardrail or a fence. The trajectory generator 140 recognizes a travelable direction in which the mobile object M can travel in the travelable area. The travelable direction is recognized based on, for example, the shape of the travelable area, the shape of the guardrail or the shape of the fence, and the shape of the sidewalk. The trajectory generator 140 recognizes, for example, the longitudinal direction of the travelable area, the longitudinal direction of the guardrail, or the longitudinal direction of the fence as the travelable direction (for example, D1 in the figure) in which the mobile object M can travel. For example, the trajectory generator 140 generates a vector based on one or more of the above-described longitudinal directions, and applies a predetermined algorithm to the direction of the generated vector to generate a trajectory. For example, the trajectory generator 140 generates a trajectory OR1 in a direction in which the mobile object M can travel in the travelable area.

[Trajectory Generation Process (2)]

Figure 10:
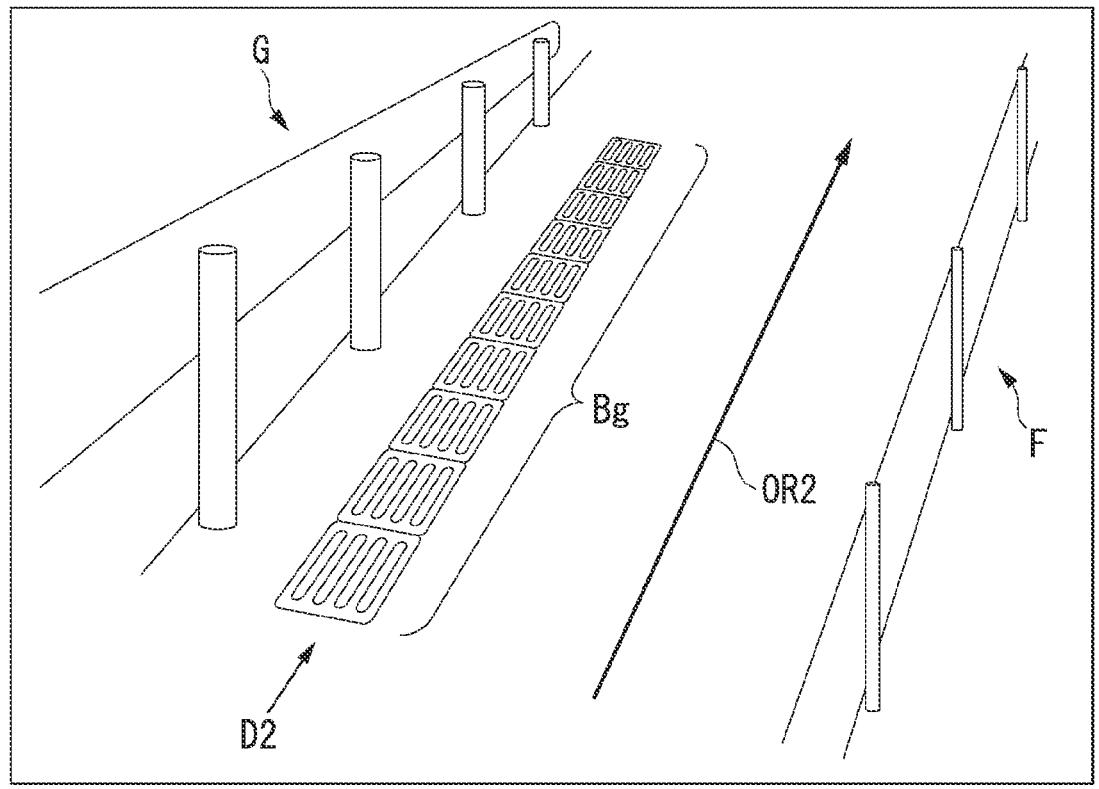
FIG. 10 is a diagram (2) showing the generation of trajectories.

FIG. 10 is a diagram (2) showing the generation of the trajectory. The trajectory generator 140 generates a trajectory taking a Braille block in addition to the travelable area AR and the structure into consideration. When the direction of the trajectory OR1 obtained based on the travelable area or the structure as described above and the direction of the trajectory OR2 match, the trajectory generator 140 determines the trajectory OR2 as the trajectory along which the mobile object M travels. Matching means that the angle between the trajectory OR1 and the trajectory OR2 when the origin of the trajectory OR1 and the origin of the trajectory OR2 are matched is equal to or less than a threshold value. The trajectory OR2 is a trajectory formed based on the traveling direction indicated by the plurality of guidance blocks Bg. The extension direction of the trajectory OR2 is, for example, a direction parallel to the traveling direction indicated by the plurality of guidance blocks Bg. The trajectory OR2 is set at a position at a predetermined distance from the guidance block Bg in the lateral direction of the guidance block Bg (for example, the arrangement direction of the plurality of guidance blocks Bg).

[Trajectory Generation Process (3)]

Figure 11:
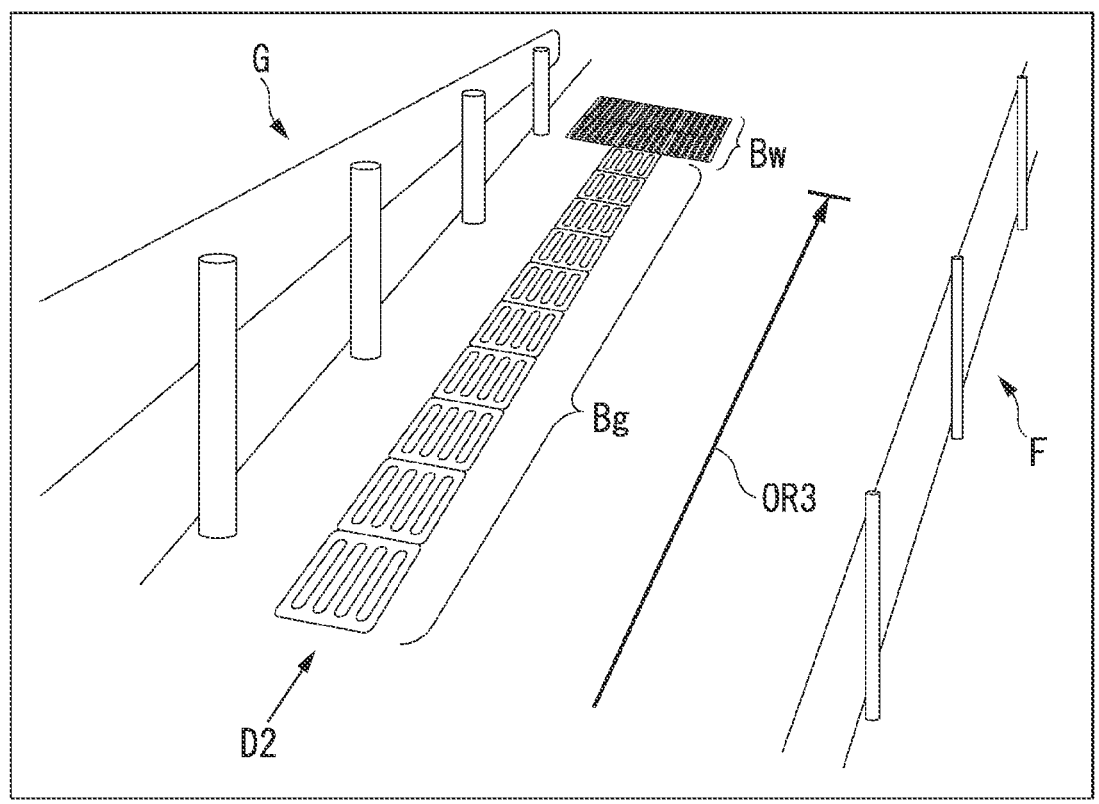
FIG. 11 is a diagram (3) showing the generation of trajectories.

FIG. 11 is a diagram (3) showing the generation of the trajectory. The trajectory generator 140 may generate a trajectory by taking a warning block Bw into consideration. For example, when the warning block Bw connected to the guidance block Bg is present in front of the guidance block Bg, the trajectory generator 140 may generate a trajectory in which the mobile object M decelerates or stops in front of the warning block Bw (or at the position or near the warning block Bw).

As described above, when the Braille block is recognized, the trajectory generator 140 generates the trajectory by taking the Braille block into consideration. When the Braille block is not present or the Braille block cannot be recognized, the trajectory generator 140 generates the trajectory based on the shape of the sidewalk structure without taking the Braille block into account. In other words, the trajectory generator 140 generates the trajectory by switching the content of the trajectory generation process based on the recognition result of the Braille block. In this way, an appropriate trajectory is generated.

[Flowchart (1)]

Figure 12:
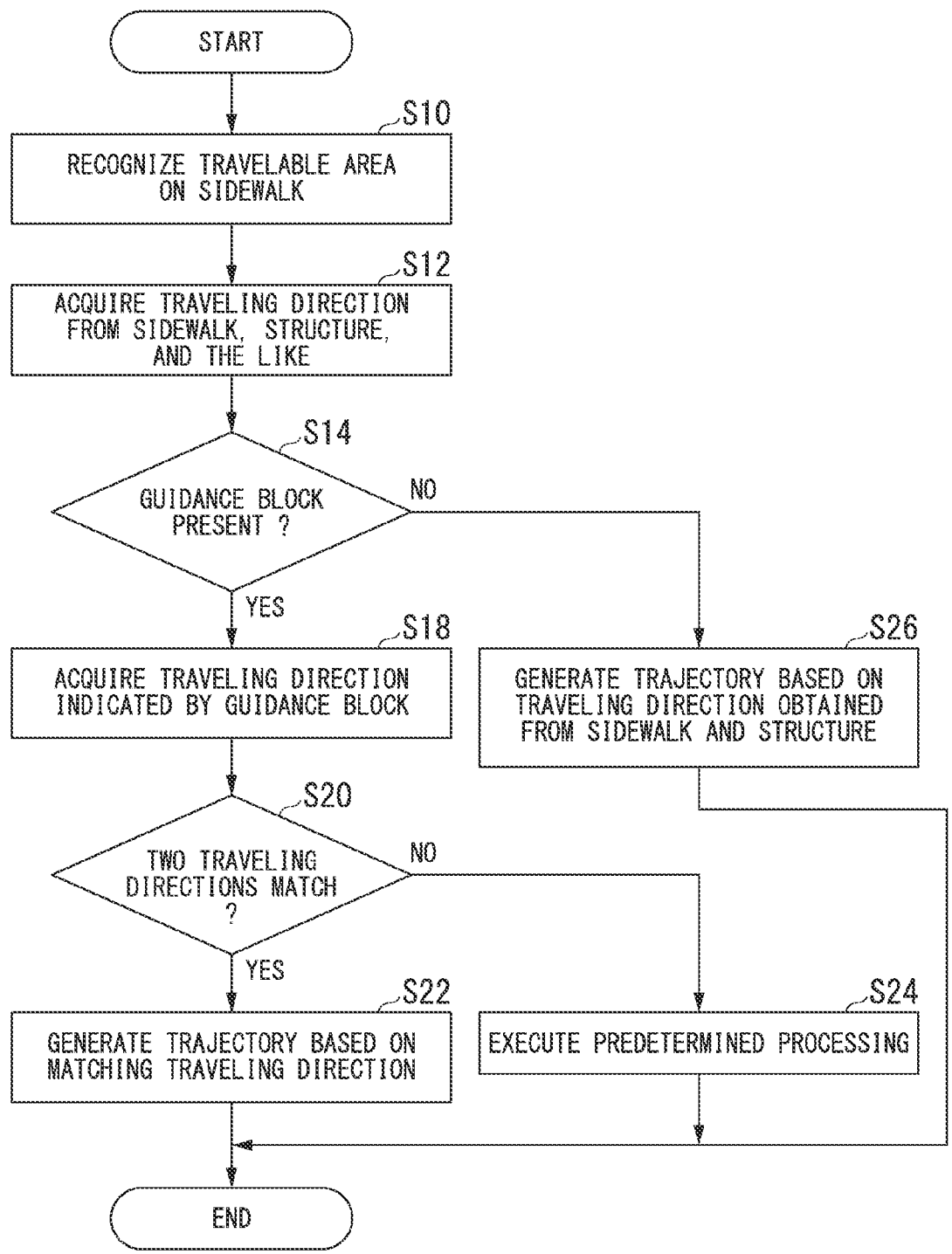
FIG. 12 is a flowchart showing an example of the flow of processing executed by a control device.

FIG. 12 is a flowchart showing an example of the flow of processing executed by the control device 100. This process is executed, for example, when the mobile object M is present on the sidewalk or is assumed to travel on the sidewalk. A part of the processing of the flowchart described below may be omitted (the same applies to FIGS. 21 and 22 to be described later).

First, the control device 100 recognizes a travelable area on a sidewalk (step S10). Next, the control device 100 acquires a travelable direction based on a sidewalk or a structure (sidewalk structure) (step S12). Next, the control device 100 determines whether a guidance block is present on the sidewalk (step S14). When the guidance block is not present, the control device 100 generates a trajectory based on the traveling direction acquired in step S12 (step S16).

When the guidance block is present, the control device 100 acquires the traveling direction based on the guidance block (step S18). Next, the control device 100 determines whether the traveling direction acquired in step S12 and the traveling direction acquired in step S18 match (step S20). When the two traveling directions match, the control device 100 generates a trajectory based on the matching traveling direction (the traveling direction obtained in step S12 or S18) (step S22).

If the two traveling directions do not match, the control device 100 executes a predetermined process (step S24). The predetermined process is, for example, a process of reacquiring the traveling direction and generating a trajectory based on the reacquired traveling direction, or a process of generating a trajectory based on the traveling direction obtained by statistically processing the two traveling directions. If the two traveling directions do not match, the control device 100 may generate a trajectory by giving priority to the traveling direction acquired based on the guidance block in step S18.

By the above-described processing, the mobile object M can switch the content of the trajectory generation process according to the recognition result of the Braille block to generate an appropriate trajectory, and the mobile object M can travel through more appropriate positions.

In the above-described process, the pedestrians present on the sidewalk are not mentioned, but the following processes may be performed when the pedestrians are present.

[Process (1) when Pedestrian is Present]

Figure 13:
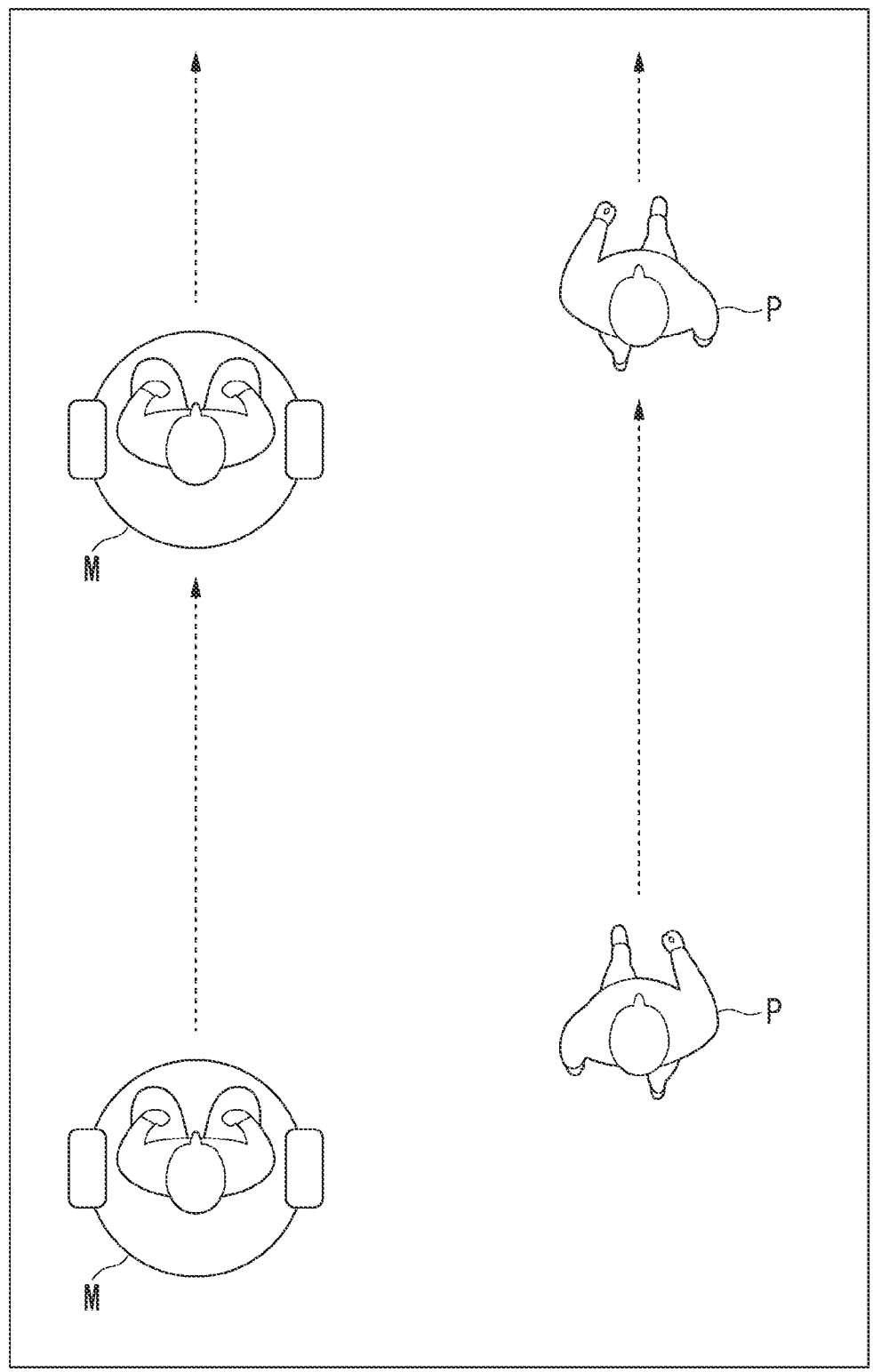
FIG. 13 is a diagram showing a process (1) when a pedestrian is present.

FIG. 13 is a diagram showing a process (1) when a pedestrian is present. When the mobile object M travels behind the pedestrian P and the traveling direction of the pedestrian P matches the traveling direction of the mobile object M, the mobile object M travels behind the pedestrian P while maintaining a position separated by a predetermined distance from the pedestrian P.

For example, when the mobile object M changes its course in the direction in which the pedestrian P is present (for example, when turning to the right in FIG. 13), the mobile object M decelerates and changes its course after the pedestrian P moves forward by a predetermined distance.

As described above, the mobile object M can travel without interfering with the walking of the pedestrian by keeping a predetermined distance or more from the pedestrian and traveling in the same direction as the pedestrian. As a result, the mobile object M travels with more consideration of the pedestrians in the vicinity.

[Process (2) when Pedestrian is Present]

Figure 14:
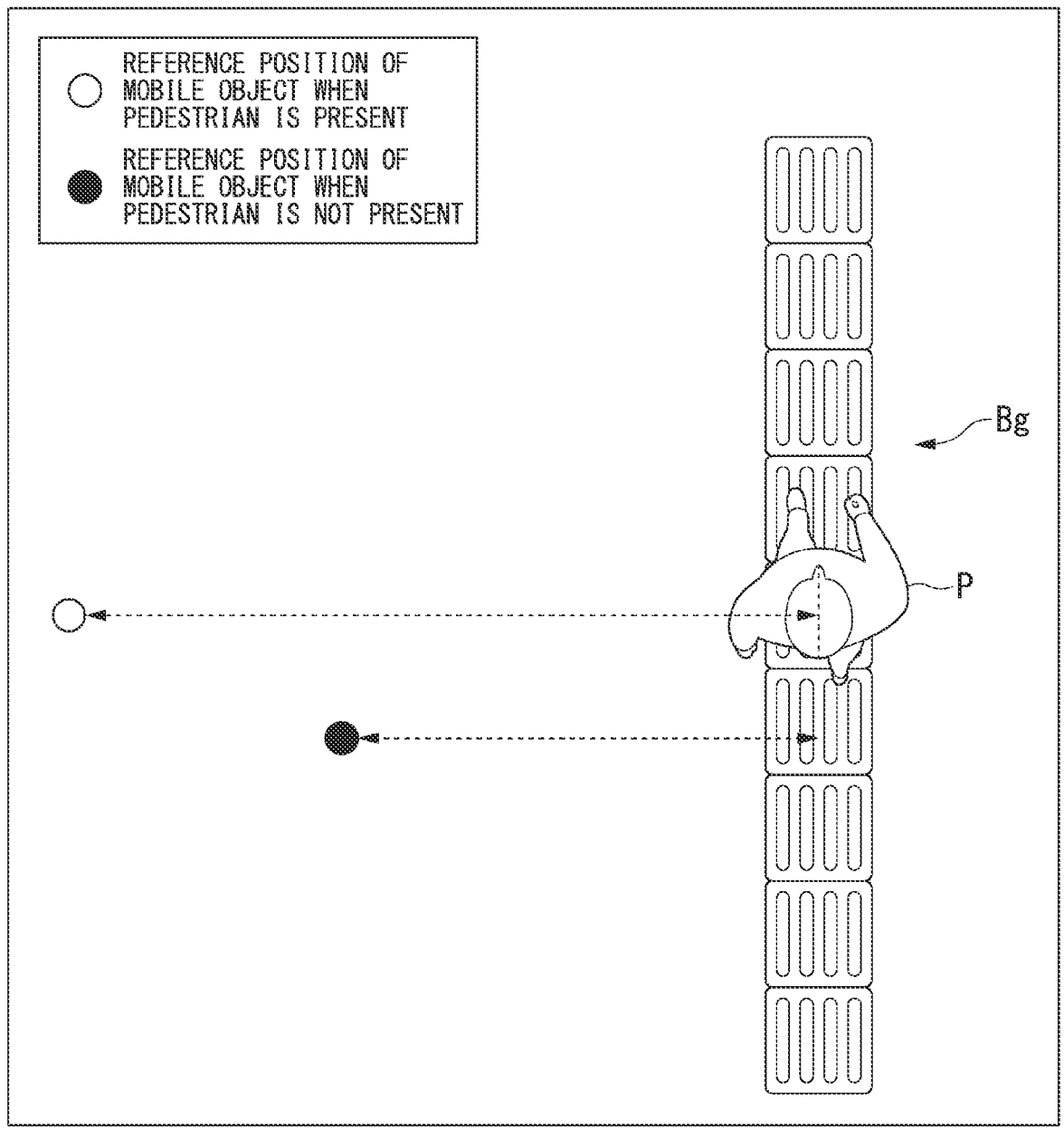
FIG. 14 is a diagram showing a process (2) when a pedestrian is present.

FIG. 14 is a diagram showing a process (2) when a pedestrian is present. When the mobile object M moves along the traveling direction indicated by the guidance block Bg and a pedestrian P moving along the traveling direction indicated by the guidance block Bg is present in the vicinity of the guidance block Bg, the mobile object M travels through positions farther than when the pedestrian P moving along the traveling direction indicated by the guidance block Bg is not present in the vicinity of the guidance block Bg.

For example, when a pedestrian is present, the reference position of the mobile object M (the position where the mobile object M travels) is set to a position at a first predetermined distance from a predetermined position. When there is no pedestrian, the reference position of the mobile object M is set to a position at a second predetermined distance from the predetermined position. The first predetermined distance is longer than the second predetermined distance. The predetermined position may be set with reference to the guidance block Bg, or may be set with reference to the pedestrian P. In the example of FIG. 14, the pedestrian P walking on the guidance block Bg is used as a target, but a pedestrian present at a position separated from the guidance block Bg by a predetermined distance may be used as a target.

As described above, when the pedestrian P is present, the mobile object M travels through positions with more consideration of pedestrians, so that the mobile object M travels with more consideration of the pedestrians in the vicinity. In other words, the mobile object M predicts that the pedestrian P travels along the guidance block Bg, and travels based on the prediction result.

[Process (3) when Pedestrian is Present]

It is assumed that the mobile object M has moved along the traveling direction indicated by the guidance block Bg1 and reached the vicinity of the warning block Bw. At this time, the pedestrian P is also present near the warning block Bw. In this case, the mobile object M decelerates or stops, and after the pedestrian P leaves the warning block Bw, the mobile object M moves in a desired moving direction.

Figure 15:
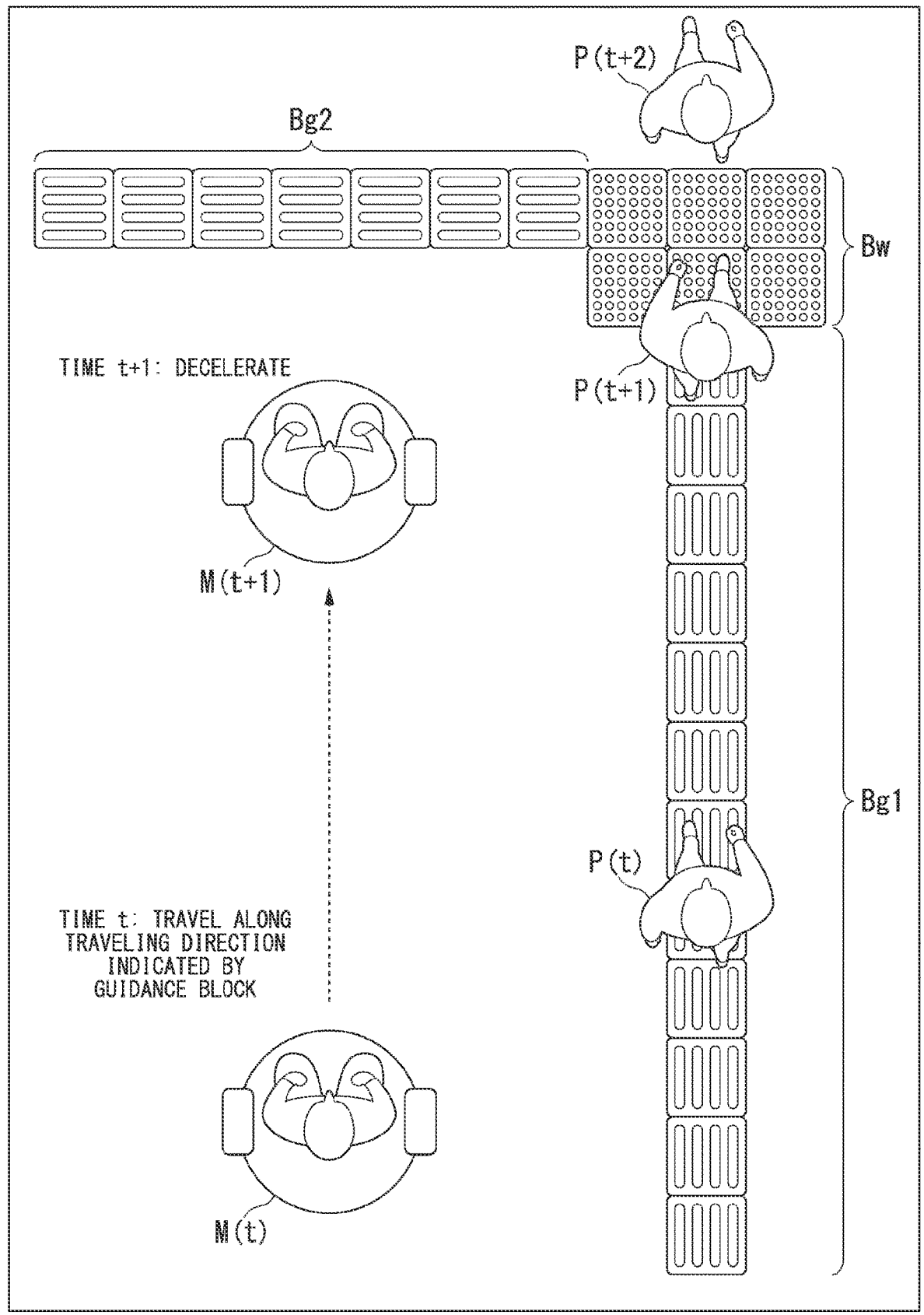
FIG. 15 is a diagram showing a process (3) when a pedestrian is present.

FIG. 15 is a diagram showing a process (3) when a pedestrian is present. At time t, the mobile object M is traveling along the traveling direction indicated by the guidance block Bg. At time t+1, the mobile object M and the pedestrian P arrive near the warning block Bw. At this time, the mobile object M decelerates. At time t+2, the pedestrian P passes the warning block Bw. After the pedestrian P passes the warning block Bw, the mobile object M moves in a desired direction (for example, the same moving direction as the pedestrian P or the traveling direction indicated by the guidance block Bg2).

As described above, the mobile object M is controlled in consideration of the possibility that the pedestrian interferes with the mobile object M in the vicinity of the warning block Bg. In other words, the mobile object M predicts that the pedestrian will move in the traveling direction of the mobile object M, and controls the traveling of the mobile object M based on the prediction result. As a result, the mobile object M travels with more consideration of the pedestrians in the vicinity.

[Process (4) when Pedestrian is Present]

Figure 16:
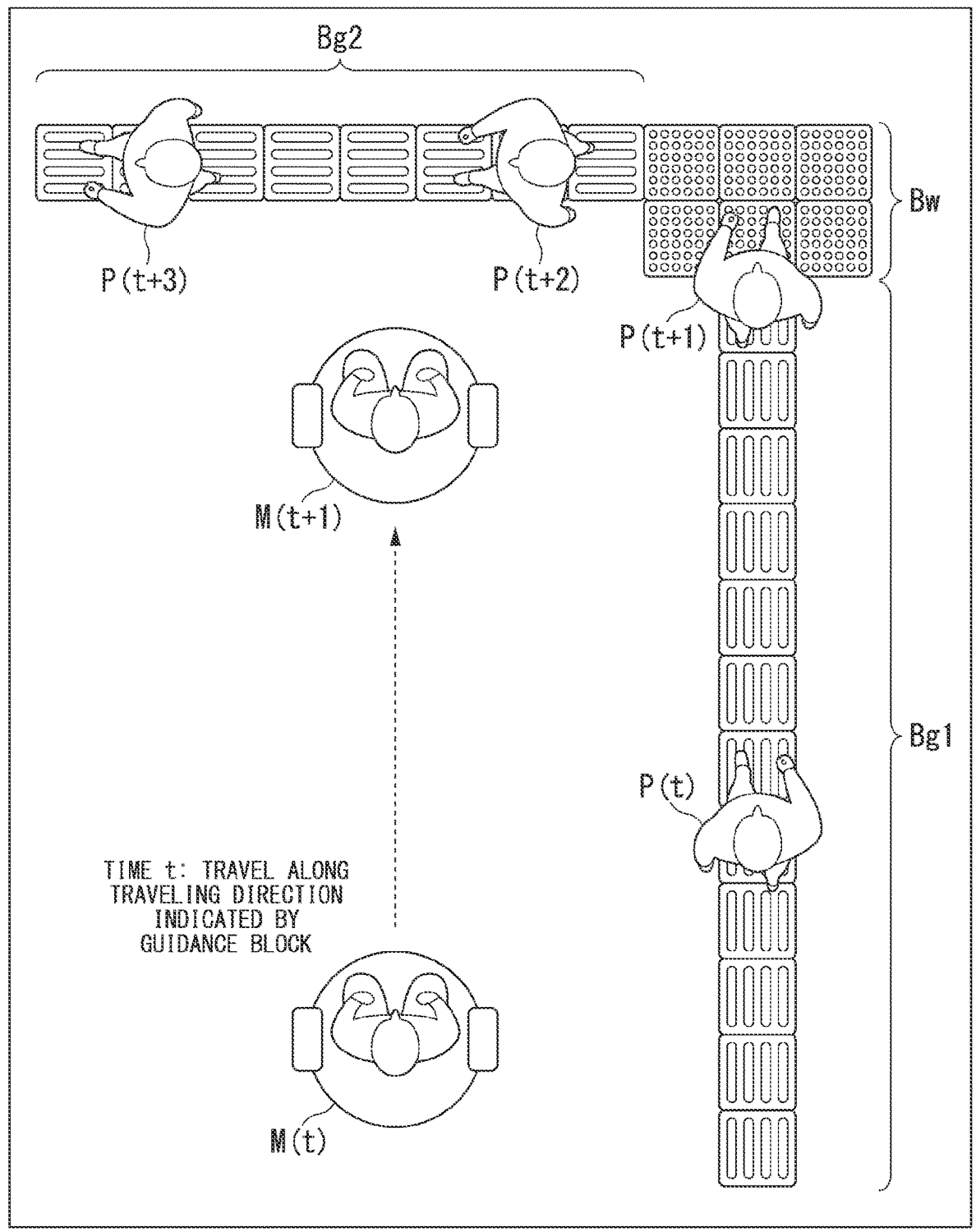
FIG. 16 is a diagram showing a process (4) when a pedestrian is present.

The difference from [Process (3) when pedestrian is present] will be mainly described. FIG. 16 is a diagram showing a process (4) when a pedestrian is present. At time t+1, the mobile object M and the pedestrian P arrive near the warning block Bw. At this time, the mobile object M decelerates. It is assumed that at time t+2, the pedestrian P walks along the guidance block Bg2. It is assumed that at time t+3, the pedestrian P crosses in front of the mobile object M, and the pedestrian P is further away from the mobile object M by a predetermined distance. After the pedestrian P is sufficiently away, the mobile object M moves in a desired direction (for example, the same moving direction as the pedestrian P or a direction straight ahead across the guidance block Bg2).

As described above, the mobile object M controls the mobile object M in consideration of the possibility that the pedestrian interferes with the mobile object M in the vicinity of the warning block Bg. In other words, the mobile object M predicts that the pedestrian will move in the traveling direction of the mobile object M, and controls the traveling of the mobile object M based on the prediction result. As a result, the mobile object M travels with more consideration of the pedestrians in the vicinity.

[Relationship Between Pedestrian Attribute and Mobile Object Behavior]

The mobile object M may change the behavior of the mobile object M based on the estimated attribute of the pedestrian in addition to the above-mentioned support information and the prediction result of the behavior of the pedestrian. The mobile object M may predict the behavior of the pedestrian in consideration of the attribute of the pedestrian, and change the behavior based on the prediction result and the support information. For example, the control device 100 of the mobile object M may predict the behavior of the pedestrian without considering the attribute of the pedestrian when determining the behavior of the mobile object M, and then correct the predicted behavior of the pedestrian based on the attribute of the pedestrian. Alternatively, the control device 100 may predict the behavior of the pedestrian in consideration of the attribute of the pedestrian and use the prediction result.

Figure 17:
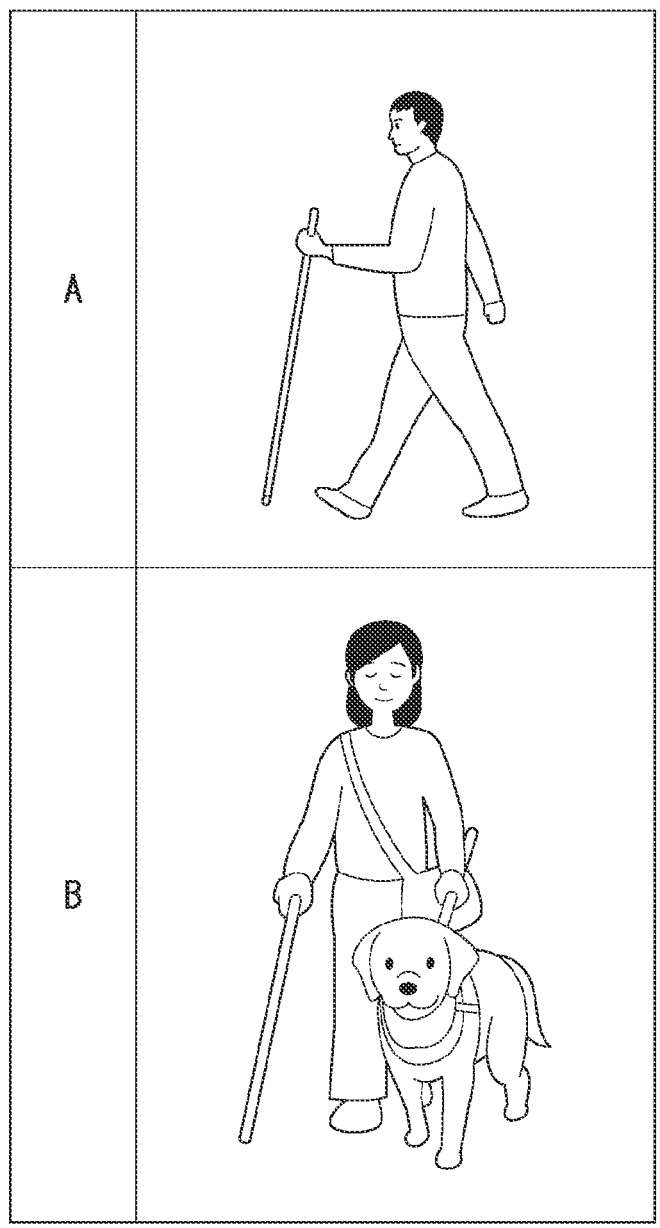
FIG. 17 is a diagram showing a specific pedestrian.

The attribute of pedestrians include, for example, a pedestrian (specific pedestrian) who is estimated to be walking using a Braille block and a pedestrian who is estimated to be walking without using a Braille block. FIG. 17 is a diagram showing a specific pedestrian. The specific pedestrian is a user who uses a predetermined cane as shown in A of FIG. 17 (for example, a cane used by a visually impaired person or the like to touch the road surface in front when walking), or a user who is walking with a guide dog as shown in B of FIG. 17.

The recognizer 120 recognizes the presence/absence of a specific pedestrian and the position of the specific pedestrian from the captured image. For example, the recognizer 120 recognizes a specific pedestrian using a pattern matching process for recognizing the specific pedestrian by comparing a template prepared in advance with a feature amount obtained from the image, or using a trained model. The trained model is a model trained to output information indicating the presence of a specific pedestrian and the position of the specific pedestrian in the image when an image in which the specific pedestrian imaged is input.

[Behavior (1) of Mobile Object when Recognizing Specific Pedestrian]

When the mobile object M recognizes that a specific pedestrian is present in the vicinity of the guidance block Bg, the mobile object M moves while maintaining a first distance from the pedestrian. When the mobile object M recognizes that a pedestrian (a pedestrian who is not the specific pedestrian) is present in the vicinity of the guidance block Bg, the mobile object M moves while maintaining a second distance from the pedestrian. The first distance is longer than the second distance. In other words, when the specific pedestrian is present, the mobile object M moves at a greater distance from the specific pedestrian than when a pedestrian is present.

Figure 18:
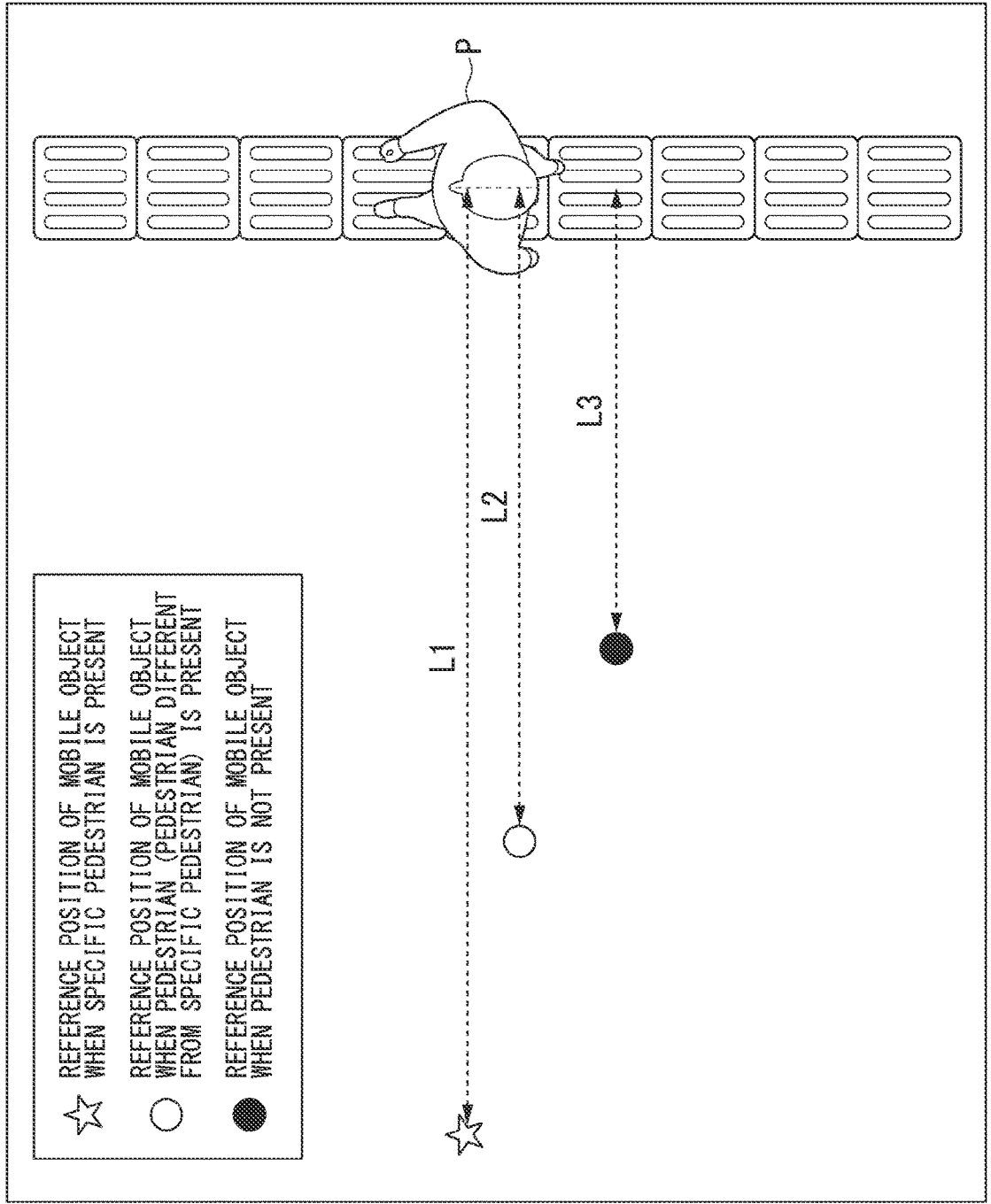
FIG. 18 is a diagram showing an example of a position of a mobile object when a specific pedestrian is present and a position of the mobile object when a pedestrian different from the specific pedestrian is present.

FIG. 18 is a diagram showing an example of the position of the mobile object M when a specific pedestrian is present and the position of the mobile object M when a pedestrian different from the specific pedestrian is present. As shown in FIG. 18, the position of the mobile object M is set to, for example, a first distance L1, a second distance L2, and a third distance L3 from the guidance block Bg. The third distance L3 is shorter than the first distance L1 and the second distance L2, and is the position of the mobile object M set when there is no pedestrian.

As described above, the mobile object M can travel with more consideration of the pedestrians in the vicinity by controlling the position of the mobile object M in consideration of the attribute of the pedestrian. For example, it may be difficult for a specific pedestrian to recognize the presence of the mobile object M, and it is predicted that the possibility of performing a behavior of approaching the mobile object M is higher than that of a pedestrian who is not a specific pedestrian. Therefore, the mobile object M can deal with such situations appropriately.

In the above-described example, the distance set when a specific pedestrian is present may be the second distance L2, and the distance set when a pedestrian is present may be the first distance L1. For example, it may be predicted that there is a high possibility that a pedestrian does not walk using the guidance block Bg, a specific pedestrian walks using the guidance block Bg, and a pedestrian moves in a direction different from the guidance direction of the guidance block Bg. In this way, the accuracy of the prediction is improved.

The predictor 130 may analyze the behavior of a pedestrian who is not a specific pedestrian and predict whether the possibility that the pedestrian will move in a direction different from the guidance direction of the guidance block Bg is more than a predetermined degree. For example, the predictor 130 predicts the behavior of a pedestrian by referring to one or more pieces of information of the direction of the face, the line of sight, and the history of the behavior of the pedestrian. For example, when the direction of the face or the line of sight is in the extension direction of the guidance blocks Bg, or when the pedestrian tends to move along the guidance direction of the guidance block Bg in the past behavior, the predictor 130 determines that the possibility of the pedestrian moving in a direction different from the guidance direction of the guidance block Bg is less than the predetermined degree (determines that the pedestrian moves in the guidance direction). In other cases, the predictor 130 determines that the possibility of the pedestrian moving in a direction different from the guidance direction is greater than or equal to the predetermined degree. When it is determined that the possibility of the pedestrian moving in a direction different from the guidance direction of the guidance block Bg is greater than or equal to the predetermined degree, the control device 100 determines the position of the mobile object M with respect to the guidance block Bg based on the prediction result. For example, when it is determined that the possibility of the pedestrian moving in a direction different from the guidance direction of the guidance block Bg is greater than or equal to the predetermined degree, the control device 100 moves the mobile object M from the position of the second distance L2 to the position of a distance (for example, the first distance L1) longer than the second distance L2. As a result, the mobile object M can move while maintaining a sufficient distance from the pedestrian who is likely to move in a direction different from the guidance direction.

When the attribute of the traffic participant is a specific traffic participant, the control device 100 may predict that the prediction degree that a traffic participant who is a specific traffic participant behaves according to the support information is a first degree. When the attribute of the traffic participant is not a specific traffic participant, the control device 100 may predict that the prediction degree that a traffic participant who is not a specific traffic participant behaves according to the support information is a second degree smaller than the first degree. The control device 100 determines the position of the mobile object M with respect to the guidance block or the pedestrian according to the prediction result. In the case of the first degree, the mobile object M may be set at a position farther from the guidance block or the pedestrian than in the case of the second degree, or may be set at a position closer to the guidance block or the pedestrian than in the case of the second degree. When the face or the line of sight of a pedestrian who is not a specific pedestrian is in the extension direction of the guidance blocks Bg, or when the pedestrian tends to move along the guidance direction of the guidance block Bg in the past behavior, the prediction degree that the traffic participant will behave according to the support information may be set to a third degree higher than the second degree. The third degree may be higher than the second degree and lower than the first degree, may be the same degree as the first degree, or may be higher than the first degree. In the case of the third degree, the mobile object M may be set at a position farther from the guidance block or the pedestrian than in the other degrees, or may be set at a position closer to the guidance block or the pedestrian than in the other degrees.

In the above-described example, the process when a specific pedestrian is recognized has been described, but in addition to (or instead of), the mobile object M may travel through positions farther away from the predetermined pedestrian than other pedestrians when a predetermined pedestrian is recognized. The predetermined pedestrian is a pedestrian who is walking by pushing a stroller or a pedestrian who is pushing a wheelchair.

As described above, the control device 100 controls the mobile object M so as to travel along the Braille block (for example, the guidance block Bg), and determines the distance of the mobile object M from the Braille block based on the attribute of the pedestrian. The mobile object M can travel with more consideration of the pedestrians in the vicinity by controlling the position of the mobile object M in consideration of the attribute of the pedestrian. The above-mentioned process related to [Behavior (1) of mobile object when recognizing specific pedestrian] is another example of the process of "determining the trajectory based on the support information and the attribute of the pedestrian".

[Behavior (2) of Mobile Object when Recognizing Specific Pedestrian]

When the mobile object M recognizes that a specific pedestrian is present in the vicinity of the warning block Bw, the mobile object M maintains a 11th distance L11 from the warning block Bw (or the specific pedestrian). When the mobile object M recognizes that a pedestrian (a pedestrian who is not a specific pedestrian) is present in the vicinity of the warning block Bw, the mobile object M maintains a 12th distance L12 from the pedestrian. The above-described maintenance may be realized by deceleration or by stopping.

Figure 19:
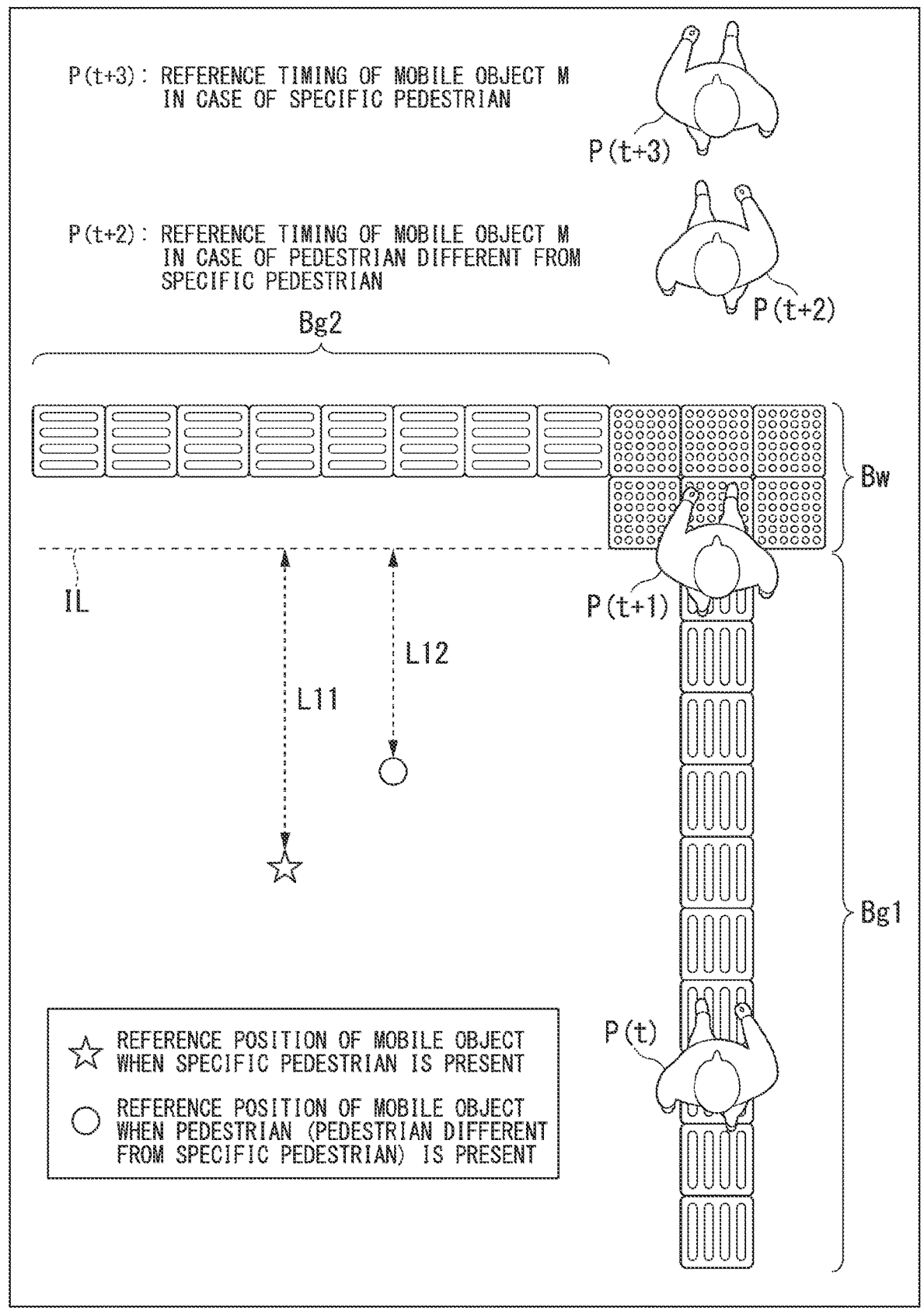
FIG. 19 is a diagram showing an example of a position of a mobile object M when a specific pedestrian is present and a position of the mobile object when a pedestrian different from the specific pedestrian is present.

FIG. 19 is a diagram showing an example of the position of the mobile object M when a specific pedestrian is present and the position of the mobile object M when a pedestrian different from the specific pedestrian is present. As shown in FIG. 19, the position of the mobile object M is set to, for example, the 11th distance L11 and the 12th distance L12 from an imaginary line IL extended from the reference line of the warning block Bw.

As described above, when a specific pedestrian is present, the mobile object M keeps a longer distance from the specific pedestrian than when a pedestrian different from the specific pedestrian is present. By doing so, the mobile object M can travel with more consideration of the pedestrians in the vicinity. The above-mentioned process related to [Behavior (2) of mobile object when recognizing specific pedestrian] is another example of the process of "determining the trajectory based on the support information and the attribute of the pedestrian".

[Behavior (3) of Mobile Object when Recognizing Specific Pedestrian]

The mobile object M performs a first behavior when a specific pedestrian passes the warning block Bw and goes straight, and performs a second behavior when a pedestrian passes the warning block Bw and goes straight. The first behavior is a behavior in which the mobile object M approaches the guidance block Bg at a timing later than that in the second behavior.

As shown in FIG. 19, the mobile object M approaches the warning block Bw (or starts the approaching operation) when the specific pedestrian reaches the position at time t+3 (at the timing of arrival). Approaching means to approach the warning block Bw closer than the 11th distance L11. As shown in FIG. 19, the mobile object M approaches the warning block Bw when a pedestrian (a pedestrian different from the specific pedestrian) reaches the position at the time t+2. Approaching means to approach the warning block Bw closer than the 12th distance L12. The position of the pedestrian at time t+3 is farther from the warning block Bw than the position of the pedestrian at time t+2. The timing at which the first behavior or the second behavior is performed may be based on the time elapsed from the time when the specific pedestrian or the pedestrian reaches the predetermined position instead of the position of the specific pedestrian or the pedestrian. For example, the first behavior may be performed when a first time elapses from the time when the predetermined position is reached (for example, when the warning block is passed), the second behavior may be performed when a second time elapses from the time when the predetermined position is reached. The first time is longer than the second time.

As described above, the mobile object M can travel with consideration of the surrounding situation in consideration of the attribute of the pedestrian by changing the control according to the attribute of the pedestrian. The above-mentioned process related to [Behavior (3) of a mobile object when a specific pedestrian is recognized] is another example of the process of "determining the trajectory based on the support information and the attribute of the pedestrian".

[Behavior (4) of Mobile Object when Recognizing a Specific Pedestrian]

The mobile object M performs a third behavior when a specific pedestrian moves along the guidance block Bg in front and crosses in front of the mobile object M (moves in a first direction), and performs a fourth behavior when a pedestrian moves along the guidance block Bg in front and crosses in front of the mobile object M. The third behavior is a behavior in which the mobile object M approaches the guidance block Bg at a timing later than that in the fourth behavior.

Figure 20:
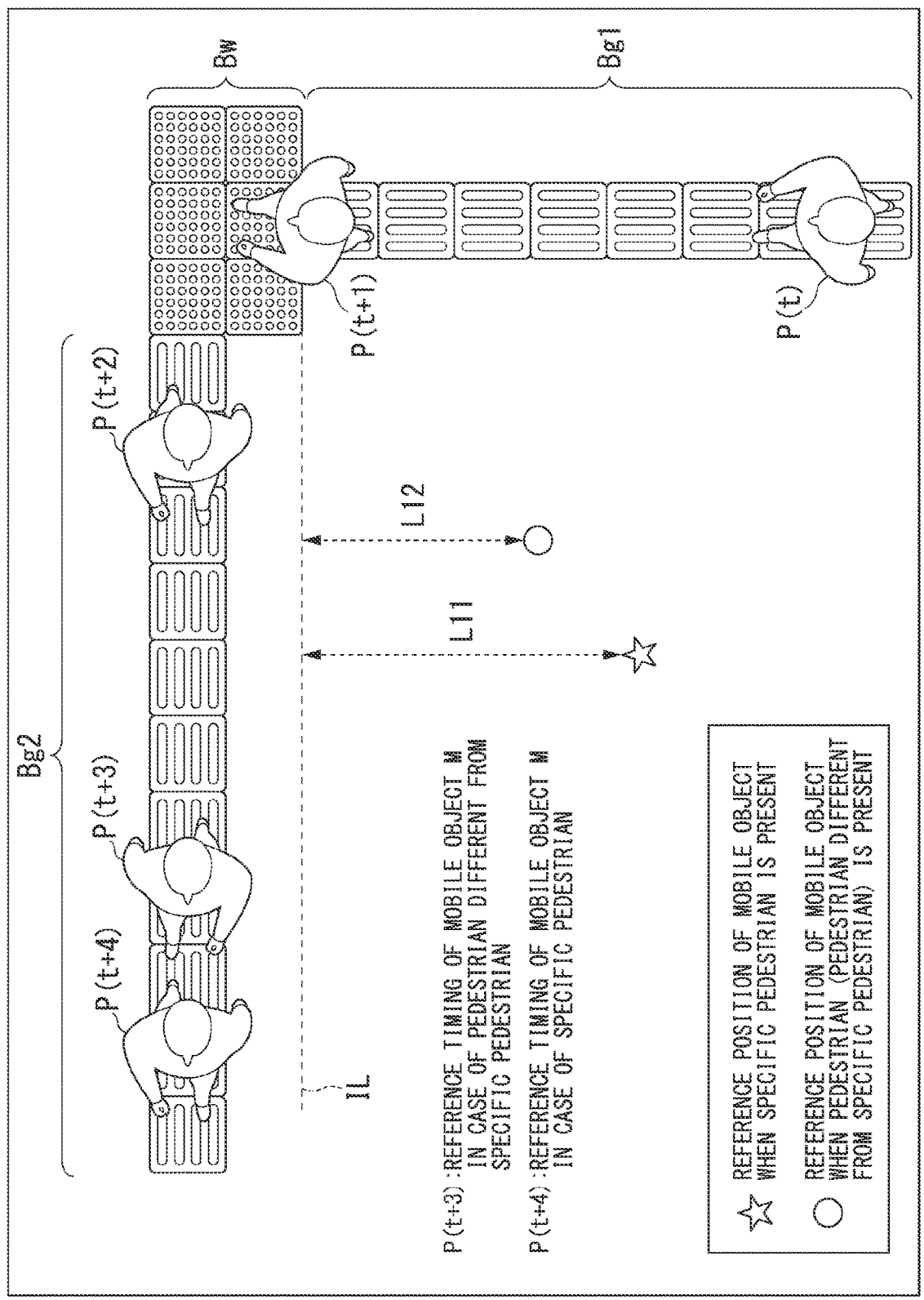
FIG. 20 is a diagram showing a third behavior and a fourth behavior.

FIG. 20 is a diagram showing the third behavior and the fourth behavior. As shown in FIG. 20, the mobile object M approaches the warning block Bw (or starts the approaching operation) when a specific pedestrian reaches the position at time t+4 (at the timing of arrival). As shown in FIG. 20, the mobile object M approaches the warning block Bw when a pedestrian (a pedestrian different from the specific pedestrian) reaches the position at the time t+3. The position of the pedestrian at time t+4 is farther from the warning block Bw than the position of the pedestrian at time t+3.

As described above, the mobile object M can travel with consideration of the surrounding situation in consideration of the attribute of the pedestrian by changing the control according to the attribute of the pedestrian. When a specific pedestrian or a pedestrian present on or near the warning block Bw moves in the direction (second direction) opposite to the direction in which the guidance block Bg2 is present, the mobile object M may cancel deceleration or start from the stopped state.

In the above-mentioned [Behavior (3) of mobile object when recognizing specific pedestrian] in FIG. 19 and [Behavior (4) of mobile object when recognizing specific pedestrian] in FIG. 20, the case where the specific pedestrian or another pedestrian is present on or near the warning block Bw has been described. However, instead of this, the mobile object may decelerate or stop when the specific pedestrian is present on or near the warning block Bw without considering other pedestrians. Since pedestrians may walk without considering the Braille block, the accuracy of the prediction for the specific pedestrian is improved by focusing on the specific pedestrian who uses the Braille block. The above-mentioned process related to [Behavior (4) of mobile object when specific pedestrian is recognized] is another example of the process of "determining the trajectory based on the support information and the attribute of the pedestrian".

[Flowchart (2)]

Figure 21:
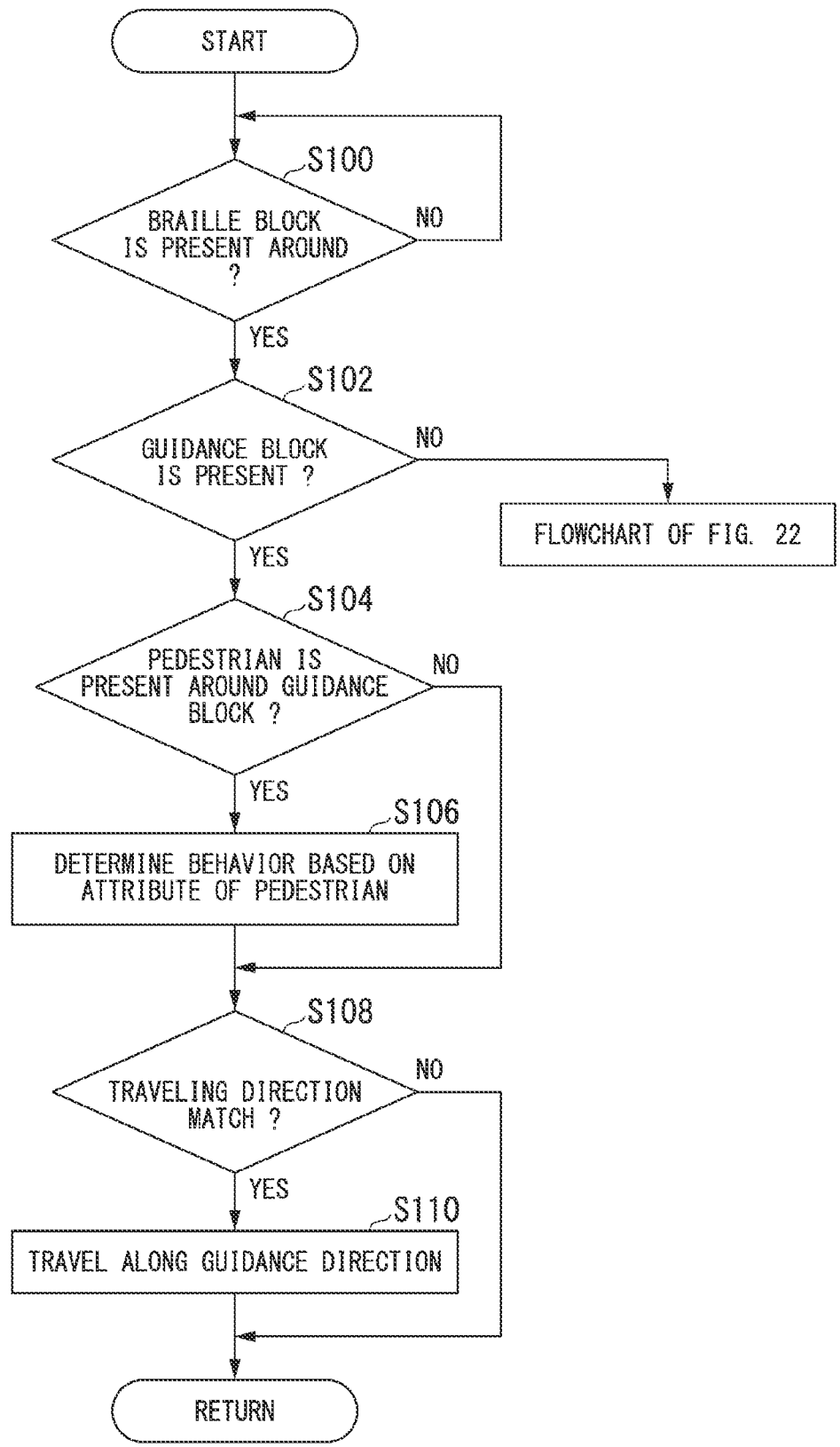
FIG. 21 is a flowchart (1) showing an example of the flow of processing executed by the control device.

FIG. 21 is a flowchart (1) showing an example of the flow of processing executed by the control device 100. First, the control device 100 determines whether there is a Braille block around the mobile object M based on the captured image (step S100). When the Braille block is present, the control device 100 determines whether the Braille block is a guidance block (step S102).

When the Braille block is not a guidance block (when it is a warning block), the processing of the flowchart of FIG. 22 to be described later is executed. When the Braille block is a guidance block, the control device 100 determines whether there is a pedestrian in the vicinity of the guidance block (step S104).

When a pedestrian is present around the guidance block, the control device 100 estimates the attribute of the pedestrian and determines the behavior of the mobile object M based on the estimated attribute (step S106). For example, the position of the mobile object M is determined as described with reference to FIG. 18 described above.

Next, the control device 100 determines whether the traveling direction of the mobile object M matches the traveling direction indicated by the guidance block (step S108). When the traveling direction of the mobile object M does not match the traveling direction indicated by the guidance block, the processing of one routine of this flowchart ends.

When the traveling direction of the mobile object M matches the traveling direction indicated by the guidance block, the control device 100 travels along the guidance direction of the guidance block (step S110). As a result, the mobile object M travels while maintaining an appropriate distance from the pedestrian according to the attribute of the pedestrian. Then, the processing of one routine of this flowchart ends.

By the above-described processing, the mobile object M can travel in consideration of the guidance block Bg, pedestrians around the guidance block Bg, and the like.

[Flowchart (3)]

Figure 22:
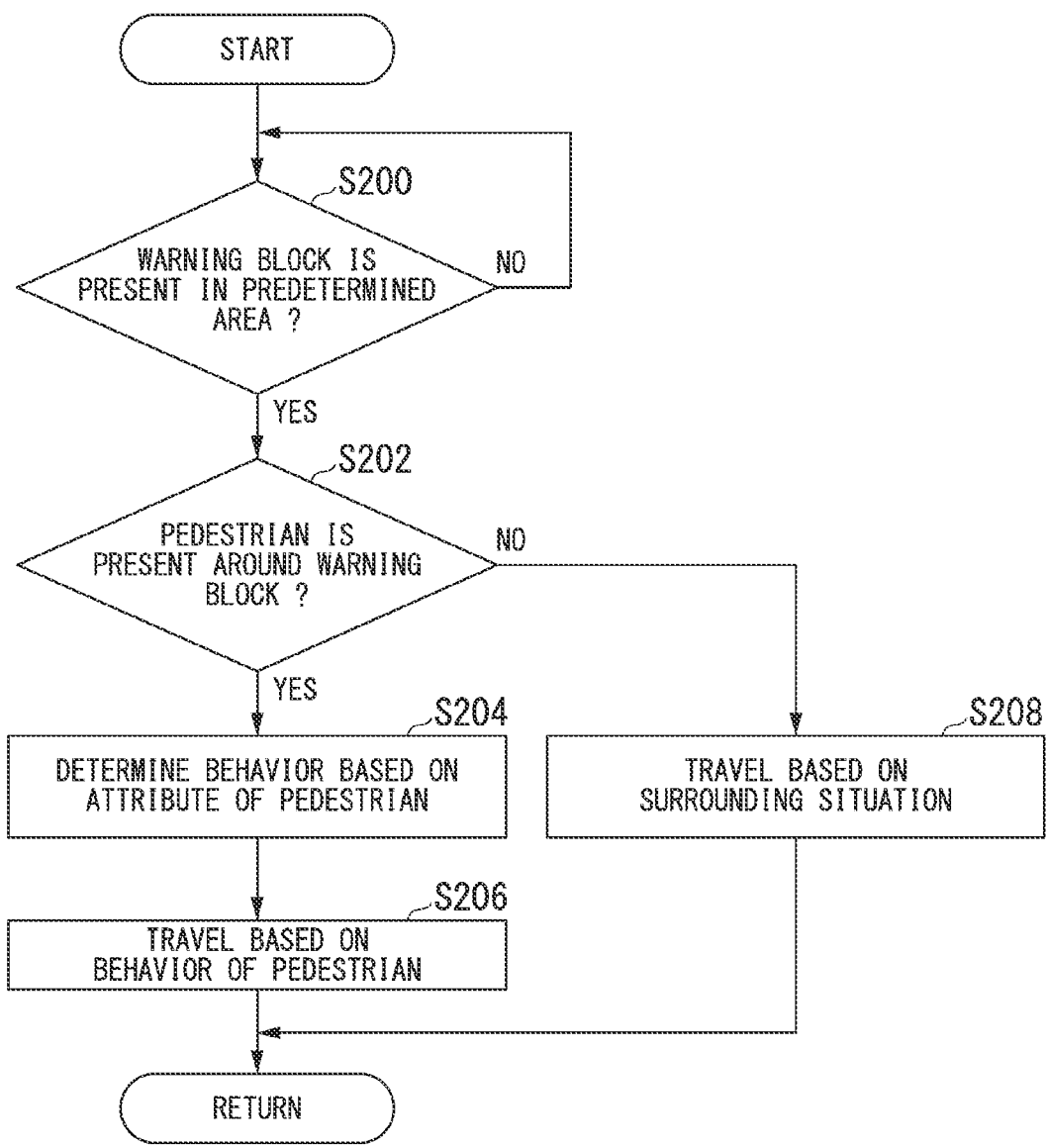
FIG. 22 is a flowchart (2) showing an example of the flow of processing executed by the control device.

FIG. 22 is a flowchart (2) showing an example of the flow of processing executed by the control device 100. First, the control device 100 determines whether the warning block is present in a predetermined area (step S200). The predetermined area is, for example, an area in front of the mobile object M and within a predetermined distance from the mobile object M. When the warning block is present, the control device 100 determines whether there is a pedestrian in the vicinity of the warning block (step S202). When there is no pedestrian around the warning block, the control device 100 travels based on the behavior of other pedestrians, other surrounding conditions, and the like (step S208).

When a pedestrian is present around the warning block, the control device 100 estimates the attribute of the pedestrian and determines the behavior of the mobile object M based on the estimated attribute of the pedestrian (step S204). For example, the position of the mobile object M is determined as described with reference to FIG. 19 or FIG. 20 described above. Next, the control device 100 travels based on the behavior of the pedestrian (step S206). For example, as described with reference to FIG. 19 or FIG. 20, the mobile object M is controlled based on the timing when the pedestrian reaches a predetermined position. In this way, the processing of one routine of this flowchart ends.

By the above-described processing, the mobile object M can travel in consideration of the warning block Bw, pedestrians around the warning block Bw, and the like.

As described above, the control device 100 executes each process to control the mobile object M, whereby the mobile object M can travel with more consideration of the surrounding situation by taking the support information, the predicted pedestrian behavior, or the pedestrian attribute. Further, the control device 100 can allow the mobile object to travel through appropriate positions by switching the trajectory generation process depending on the presence of the Braille block to generate an appropriate trajectory.

The traffic participant may be a person who is present on an indoor road or passage (for example, a road or a passage in a facility such as an airport), or may be a person who is present on an outdoor road or passage. In the above-described example, the traffic participant has been described as being a pedestrian as an example. However, instead of this (or in addition to this), the traffic participant may include is a bicycle which is a light vehicle and another type of traffic participant. The control device 100 acquires an image in which a road (an area in which the traffic participant can travel) on which the mobile object M is present is imaged and recognizes the support information for supporting the movement of a specific traffic participant who is a traffic participant having a predetermined attribute appearing in the road surface included in the image and the structure of the road included in the image or a road structure which is the structure provided on the road. The structure of a road is the direction in which the road (sidewalk, roadway, route) extends. The structure provided on the road includes guardrails, curbs, fences, plants, and other objects provided along the route. When the support information is recognized, the control device 100 moves the mobile object M based on at least the trajectory determined using the support information. When the support information is not recognized, the control device 100 moves the mobile object M based on the trajectory determined using the sidewalk structure without using the support information. The "support information" includes priority signs for traffic participants (for example, bicycles), information indicating the direction of travel, stop positions, information prompting deceleration, information prompting stop, and the like. When the support information is a Braille block, the control device 100 predicts that it is highly likely that traffic participants other than pedestrians do not behave according to the information indicated by the Braille block. For example, the control device 100 predicts that a traffic participant such as a bicycle travels on a place different from the sidewalk provided with a support block.

As described above, the control device 100 can allow the mobile object M to travel through more appropriate positions based on the trajectory determined using one or both of the support information and the sidewalk structure.

The embodiments described above can be expressed as follows.

A control device including: a storage device that stores a program; and a hardware processor, wherein the hardware processor executes the program stored in the storage device to execute: acquiring an image in which a road where a mobile object is present is imaged; recognizing support information for supporting movement of a specific traffic participant who is a traffic participant having a predetermined attribute appearing on a road surface included in the image; recognizing a road structure included in the image or a road structure which is a structure provided on the road; moving the mobile object at least based on a trajectory determined using the support information when the support information is recognized; and moving the mobile object based on a trajectory determined using the road structure without using the support information when the support information has not been recognized.

While modes for carrying out the present invention have been described using embodiments, the present invention is not limited to these embodiments, and various changes and substitutions can be made without departing from the spirit of the present invention.

What is claimed is:

1. A mobile object control system comprising:
a storage device configured to store instructions; and
one or more processors,
wherein the one or more processors execute the instructions stored in the storage device to:
acquire an image in which a road where a mobile object is present is imaged;
recognize support information for supporting movement of a specific traffic participant who is a traffic participant having a predetermined attribute appearing on a road surface included in the image;
recognize a road structure included in the image or a road structure which is a structure provided on the road in the image;
move the mobile object at least based on a trajectory determined using the support information when the support information is recognized; and
move the mobile object based on a trajectory determined using the road structure without using the support information when the support information has not been recognized.

2. The mobile object control system according to claim 1, wherein
the support information is a plurality of Braille blocks provided on a sidewalk of the road, and
the one or more processors execute the instructions to:
determine the trajectory at least based on a direction in which the plurality of Braille blocks are connected when the support information is recognized.

3. The mobile object control system according to claim 1, wherein
the one or more processors execute the instructions to:
move the mobile object based on a trajectory determined using an extension direction of a sidewalk included in the road, a structure that separates the sidewalk from a roadway, or a structure that separates the sidewalk from a region different from the sidewalk on an opposite side of the roadway without using the support information when the support information has not been recognized.

4. The mobile object control system according to claim 3, wherein
the structure is a guardrail, a curb, a fence, or a plant.

5. The mobile object control system according to claim 1, wherein
the traffic participant is a pedestrian, and
the one or more processors execute the instructions to:
determine the trajectory based on the support information and an attribute of the pedestrian when the support information is recognized and a pedestrian is present in the a position according to where the support information appears or in the vicinity of a position according to where the support information appears.

6. The mobile object control system according to claim 1, wherein
the traffic participant is a pedestrian and
the one or more processors execute the instructions to:
generate a trajectory for moving through positions farther from the pedestrian when the pedestrian is the specific traffic participant than when the pedestrian is a pedestrian different from the specific traffic participant.

7. The mobile object control system according to claim 1, wherein
the traffic participant is a pedestrian and
the support information is a plurality of Braille blocks provided on a sidewalk of the road,
the Braille blocks include a guidance block that indicates a traveling direction in which the specific traffic participant travels and guides movement of the specific traffic participant, and a warning block that warns the specific traffic participant, and
the one or more processors execute the instructions to:
when it is recognized that the guidance block and a warning block connected to the guidance block are provided in this order on a sidewalk from a position of the mobile object,
move the mobile object based on a first trajectory in which the mobile object moves along a guidance direction indicated by the guidance block and the mobile object decelerates or stops at or in the vicinity of the warning block.

8. The mobile object control system according to claim 7, wherein the traffic participant is a pedestrian, and the one or more processors execute the instructions to:

cancel deceleration of the mobile object or starting the mobile object from a stopped state when condition (b), (c), or (d) is satisfied after condition (a) is satisfied:

(a) the specific traffic participant is present at or in the vicinity of a warning block when the mobile object decelerates or stops and the mobile object moving based on the first trajectory reaches the warning block or the vicinity of the warning block;

(b) the specific traffic participant is going straight ahead after passing a warning block;

(c) the specific traffic participant is moving in a first direction and has crossed the mobile object; and (d) the specific traffic participant moves in a second direction opposite to the first direction.

9. A control method for causing a computer to execute:

acquiring an image in which a road where a mobile object is present is imaged;

recognizing support information for supporting walking of a specific traffic participant who is a traffic participant having a predetermined attribute appearing on a road surface included in the image;

recognizing a road structure included in the image or a road structure which is a structure provided on the road;

moving the mobile object at least based on a trajectory determined using the support information when the support information is recognized; and moving the mobile object based on a trajectory determined using the road structure without using the support information when the support information has not been recognized.

10. A non-transitory computer storage medium storing a program causing a computer to execute:

acquiring an image in which a road where a mobile object is present is imaged;

recognizing support information for supporting walking of a specific traffic participant who is a traffic participant having a predetermined attribute appearing on a road surface included in the image;

recognizing a road structure included in the image or a road structure which is a structure provided on the road;

moving the mobile object at least based on a trajectory determined using the support information when the support information is recognized; and moving the mobile object based on a trajectory determined using the road structure without using the support information when the support information has not been recognized.

* * * * *